(12) United States Patent
Liu et al.

(10) Patent No.: US 12,377,878 B2
(45) Date of Patent: Aug. 5, 2025

(54) WHEEL TORQUE ESTIMATION FOR AUTONOMOUS DRIVING

(71) Applicant: TUSIMPLE, INC., San Diego, CA (US)

(72) Inventors: Jingxuan Liu, San Diego, CA (US); Arda Kurt, San Diego, CA (US); Junbo Jing, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 118 days.

(21) Appl. No.: 18/341,121

(22) Filed: Jun. 26, 2023

(65) Prior Publication Data

US 2023/0415777 A1    Dec. 28, 2023

Related U.S. Application Data

(60) Provisional application No. 63/367,094, filed on Jun. 27, 2022.

(51) Int. Cl.
| | |
|---|---|
| *B60W 60/00* | (2020.01) |
| *B60W 40/076* | (2012.01) |
| *B60W 40/107* | (2012.01) |
| *B60W 40/13* | (2012.01) |
| *B60W 50/00* | (2006.01) |
| *H04L 12/40* | (2006.01) |

(52) U.S. Cl.
CPC ...... *B60W 60/0015* (2020.02); *B60W 40/076* (2013.01); *B60W 40/107* (2013.01);
(Continued)

(58) Field of Classification Search
CPC .. B60W 40/076; B60W 40/107; B60W 40/13; B60W 50/00; B60W 60/0015;
(Continued)

(56) References Cited

U.S. PATENT DOCUMENTS

| | | |
|---|---|---|
| 2007/0038357 A1 | 2/2007 | Leminoux et al. |
| 2012/0072065 A1 | 3/2012 | Minamikawa et al. |

(Continued)

FOREIGN PATENT DOCUMENTS

| | | |
|---|---|---|
| DE | 102006001914 A1 | 7/2007 |
| WO | 2020104066 A1 | 5/2020 |

(Continued)

*Primary Examiner* — Edwin A Young
(74) *Attorney, Agent, or Firm* — Perkins Coie LLP

(57) ABSTRACT

Devices, systems, and methods for estimating wheel torque in an autonomous vehicle include a method for controlling a vehicle includes using a dual filter framework to generate an updated estimate of a wheel torque, and controlling, based on the updated estimate of the wheel torque, the vehicle. A first filter of the dual filter framework is configured to generate a blended estimate of the wheel torque by combining a first estimate of the wheel torque that is generated based on a set of mechanical torque transfer models of at least a powertrain and a brake of the vehicle and a second estimate of wheel torque that is generated based on an inverted longitudinal dynamic model, and a second non-linear filter of the dual filter framework is configured to generate the updated estimate of a wheel torque and vehicle velocity based on a torque delivery damping process model on vehicle motion.

20 Claims, 16 Drawing Sheets

(52) U.S. Cl.
CPC ............ *B60W 40/13* (2013.01); *B60W 50/00* (2013.01); *H04L 12/40* (2013.01); *B60W 2050/0052* (2013.01); *B60W 2510/0657* (2013.01); *B60W 2510/18* (2013.01); *B60W 2530/10* (2013.01); *B60W 2552/15* (2020.02); *H04L 2012/40215* (2013.01); *H04L 2012/40273* (2013.01)

(58) Field of Classification Search
CPC ..... B60W 2552/15; B60W 2050/0052; B60W 2510/0657; B60W 2510/18; B60W 2520/10; H04L 12/40; H04L 2012/40215; H04L 2012/40273
See application file for complete search history.

(56) References Cited

U.S. PATENT DOCUMENTS

| | | | |
|---|---|---|---|
| 2012/0277941 | A1 | 11/2012 | Noffsinger et al. |
| 2016/0281845 | A1 | 9/2016 | Pietron et al. |
| 2016/0304080 | A1 | 10/2016 | Sugiyama et al. |
| 2016/0334790 | A1 | 11/2016 | Rust et al. |
| 2017/0297549 | A1* | 10/2017 | Huang ................ B60T 13/745 |
| 2017/0305396 | A1 | 10/2017 | Shiratsuchi |
| 2018/0134311 | A1* | 5/2018 | Carriazo-Rabadán ...................... B62D 5/0457 |
| 2018/0257656 | A1* | 9/2018 | Zhao ........................ B60K 6/52 |
| 2018/0339685 | A1 | 11/2018 | Hill et al. |
| 2019/0210603 | A1* | 7/2019 | Xu ...................... B60W 10/184 |
| 2019/0361454 | A1 | 11/2019 | Zeng et al. |
| 2020/0010062 | A1 | 1/2020 | Switkes et al. |
| 2020/0089241 | A1 | 3/2020 | Kao et al. |
| 2020/0232842 | A1* | 7/2020 | Huang ................ B60W 30/143 |
| 2020/0256460 | A1 | 8/2020 | Naito et al. |
| 2020/0269845 | A1 | 8/2020 | Hammarberg et al. |
| 2020/0331447 | A1 | 10/2020 | Lee et al. |
| 2022/0242413 | A1 | 8/2022 | Jing et al. |

FOREIGN PATENT DOCUMENTS

| | | |
|---|---|---|
| WO | 2023283667 A1 | 1/2023 |
| WO | 2024121887 A1 | 6/2024 |

* cited by examiner

Algorithm 3 Wheel Torque Source Allocation $T_{frc\_prss} <= 0$, $T_{whltrq\_engbrk} <= 0$, $T_{whltrq\_fdbrk} <= 0$ (when $v > 0$)

Mode 1/5:
if Propulsion torque only/coast down then
    Allocate all equivalent wheel torque estimation to $T_{whltrq\_prop}$:
    $T_{whltrq\_prop} = T_{whltrq\_ekf}$
    $T_{whltrq\_engbrk} = 0$
    $T_{whltrq\_fdbrk} = 0$
end if

Mode 2:
if Foundation brake only then
    Allocate all equivalent wheel torque estimation to $T_{whltrq\_fdbrk}$ while allocate friction related torque:
    $T_{whltrq\_prop} = T_{frc\_prss}$
    $T_{whltrq\_engbrk} = 0$
    $T_{whltrq\_fdbrk} = T_{whltrq\_ekf} - T_{frc\_prss}$
end if

Mode 3:
if Engine brake only then
    Allocate all equivalent wheel torque estimation to $T_{whltrq\_engbrk}$ while considering friction related torque:
    $T_{whltrq\_prop} = T_{frc\_prss}$
    $T_{whltrq\_engbrk} = T_{whltrq\_ekf} - T_{frc\_prss}$
    $T_{whltrq\_fdbrk} = 0$
end if

Mode 4:
if Both engine and foundation brake are applied then
    Allocate wheel torque estimation to $T_{whltrq\_fdbrk}$ since it's the dominant source (best quality estimation to dominant source) while use actuator model computation for $T_{whltrq\_engbrk}$:
    $T_{whltrq\_prop} = T_{frc\_prss}$
    $T_{whltrq\_engbrk} = T_{powertrain} - T_{frc\_prss}$
    $T_{whltrq\_fdbrk} = T_{whltrq\_ekf} - T_{powertrain}$
end if

Mode 6:
if Ego is at stop condition then
    This condition is handled separately due to the fact that static friction has different mechanism compared to kinetic friction. Refer details in section 3.3:
    $T_{whltrq\_prop} = T_{powertrain}$
    $T_{whltrq\_engbrk} = 0$
    $T_{whltrq\_fdbrk} = T_{whltrq\_ekf} - T_{powertrain}$
end if

FIG. 6

WHEEL TORQUE ESTIMATION FOR AUTONOMOUS DRIVING

CROSS-REFERENCE TO RELATED APPLICATIONS

This patent document claims priority to and the benefit of U.S. Provisional Application No. 63/367,094, filed on Jun. 27, 2022. The aforementioned application is incorporated by reference herein in its entirety.

TECHNICAL FIELD

This document generally relates to controlling vehicles, and in particular, estimating wheel torque and generating control commands based thereon for autonomous vehicles.

BACKGROUND

Autonomous vehicle navigation is a technology for sensing the position and movement of a vehicle, and based on the sensing, autonomously control the vehicle to navigate towards a destination. Autonomous vehicle control and navigation can have important applications in transportation of people, goods, and services. Efficiently generating commands for the wheel torque of a vehicle that enable its accurate control is paramount for the safety of the vehicle and its passengers, as well as people and property in the vicinity of the vehicle, and for the operating efficiency of driving missions.

SUMMARY

Devices, systems, and methods for wheel torque estimation are described. In an example, this is achieved by using a dual filter framework to generate an updated estimate of a wheel torque, and controlling, based on the updated estimate of the wheel torque, the vehicle, wherein a first filter of the dual filter framework is configured to generate a blended estimate of the wheel torque by combining (a) a first estimate of the wheel torque that is generated based a mechanical model of at least a transmission of the vehicle and (b) a second estimate of wheel torque that is generated based on an inverted longitudinal dynamic model that is a function of the velocity of a vehicle and the acceleration of the vehicle, and wherein the second non-linear filter of the dual filter framework is configured to generate the updated estimate of the wheel torque and an updated estimate of the velocity of the vehicle based on a torque delivery damping process model for the vehicle motion.

In yet another aspect, the methods described herein are embodied in the form of processor-executable code and stored in a computer-readable program medium.

In yet another aspect, a device that is configured or operable to perform the methods described herein is disclosed. The device may include a processor that is programmed to implement this method.

The above and other aspects and features of the disclosed technology are described in greater detail in the drawings, the description, and the claims.

BRIEF DESCRIPTION OF THE DRAWINGS

FIG. 6 shows an example algorithm for wheel torque source allocation.

DETAILED DESCRIPTION

The transportation industry has been undergoing considerable changes in the way technology is used to control the operation of vehicles. As exemplified in the automotive passenger vehicle, there has been a general advancement towards shifting more of the operational and navigational decision making away from the human driver and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Different types of autonomous vehicles have been classified into different levels of automation under the Society of Automotive Engineers' (SAE) J3016 standard, which ranges from Level 0 in which the vehicle has no automation to Level 5 (L5) in which the vehicle has full autonomy. In an example, SAE Level 4 (L4) is characterized by the vehicle operating without human input or oversight but only under select conditions defined by factors such as road type or geographic area. In order to achieve SAE L4 autonomy, vehicle control commands that are generated include control commands based on the estimated wheel torque.

Torque (or wheel torque), in either the engine domain or the wheel domain, is typically defined as a control input to a prediction model for longitudinal motion control, especially when using a model predictive controller (MPC) framework, of an autonomous vehicle. In these cases, optimizing the objective function commonly involves minimizing the rate of change of the torque to generate smooth torque commands.

Figure 1:
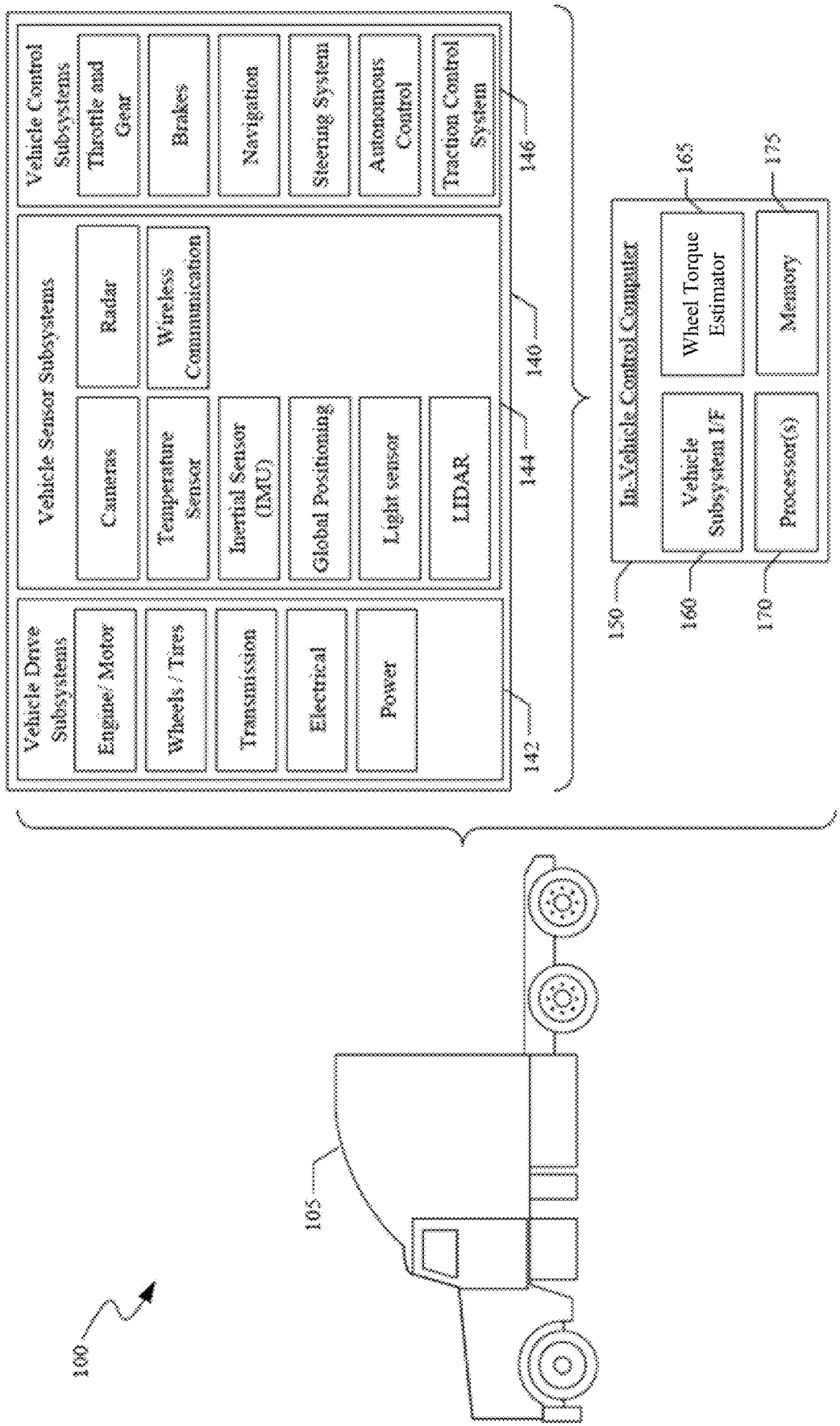
FIG. 1 shows a block diagram of an example vehicle ecosystem in which an in-vehicle control computer located in the vehicle comprises a wheel torque estimator.

FIG. 1 shows a block diagram of an example vehicle ecosystem 100 in which an in-vehicle control computer 150 located in the autonomous vehicle 105 includes a predictive anti-lag braking controller that can account for the lag effects of the pneumatic components of the foundation brake system. As shown in FIG. 1, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an O2 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an anti-lock brake system (ABS) that can prevent the brakes from locking up when the brakes are applied. Additionally, the brake unit may include an engine braking system. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the wheel torque estimator 165 as explained in this document. For instance, the processor 170 executes the operations associated with wheel torque estimator 165, which can be configured to leverage the brakes, throttle and gear, and/or the traction control system in the control subsystem 146. The operations of wheel torque estimator 165 are further described in this document.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

In some embodiments, the described methods, devices, and systems are directed to SAE L4 autonomous driving dynamic control systems, which cover SAE L1-L3 driving assistance applications, semi-autonomous systems, and expand to the full coverage of vehicle dynamic control needs in real-world driving, which may include lane changes, merging into traffic, navigating highway on/off ramps, passing through intersections, maneuvering through congested traffic, parking operations, docking operations, etc. In contrast to conventional systems that focus on a single control target, embodiments of the disclosed technology are part of the processing of a control mission that involves control targets defined in multiple dimensions and which are typically time varying.

Embodiments of the disclosed technology are directed to estimating the wheel torque by combining actuation model-based approach and a dynamics model-based approach, which advantageously enhances the redundancy in wheel torque estimation, thereby counteracting any sensor failures, and mitigates the quantization noise from the actuator model without using passive filters.

Section headings are used in the document to improve readability of descriptions and do not in any way limit the discussion or the embodiments to the respective sections only.

1 Overview of Wheel Torque Estimation

Embodiments of the disclosed technology provide methods and systems for estimating the wheel torque, in the wheel domain, to enable generation of a torque feedback signal for the longitudinal controller. The wheel torque is estimated in the wheel domain for at least the following reasons:

(1) The longitudinal MPC formulation (detailed in U.S. patent application Ser. No. 17/164,207) is defined in the wheel domain, and estimating the wheel torque in the wheel domain aligns the control formulation;

(2) The wheel torque applies directly to the vehicle dynamics, whereas engine torque transmits through the transmission, clutch dynamics, drive axle, and other powertrain components, before exerting a force on the wheel to change wheel motion. From a sensing perspective, most of the sensors used for autonomous driving are for vehicle states such as speed, acceleration, heading and so on, which makes the vehicle states more observable and accessible. The relevant information can be utilized better if the estimation problem is defined to be in wheel domain; and (3) This approach decouples autonomous vehicle development from OEM and actuator suppliers with regard to knowledge sharing. During system integration, if the wheel torque interface is defined in the wheel-domain, key components such as engine, powertrain and foundation brake can be kept external with regard to motion control. In this way, the autonomous vehicle development does not rely on details regarding each component. For example, as long as the delivery of the torque in the wheel domain meets requirements, the control performance can be guaranteed to meet design specifications.

Figure 2:
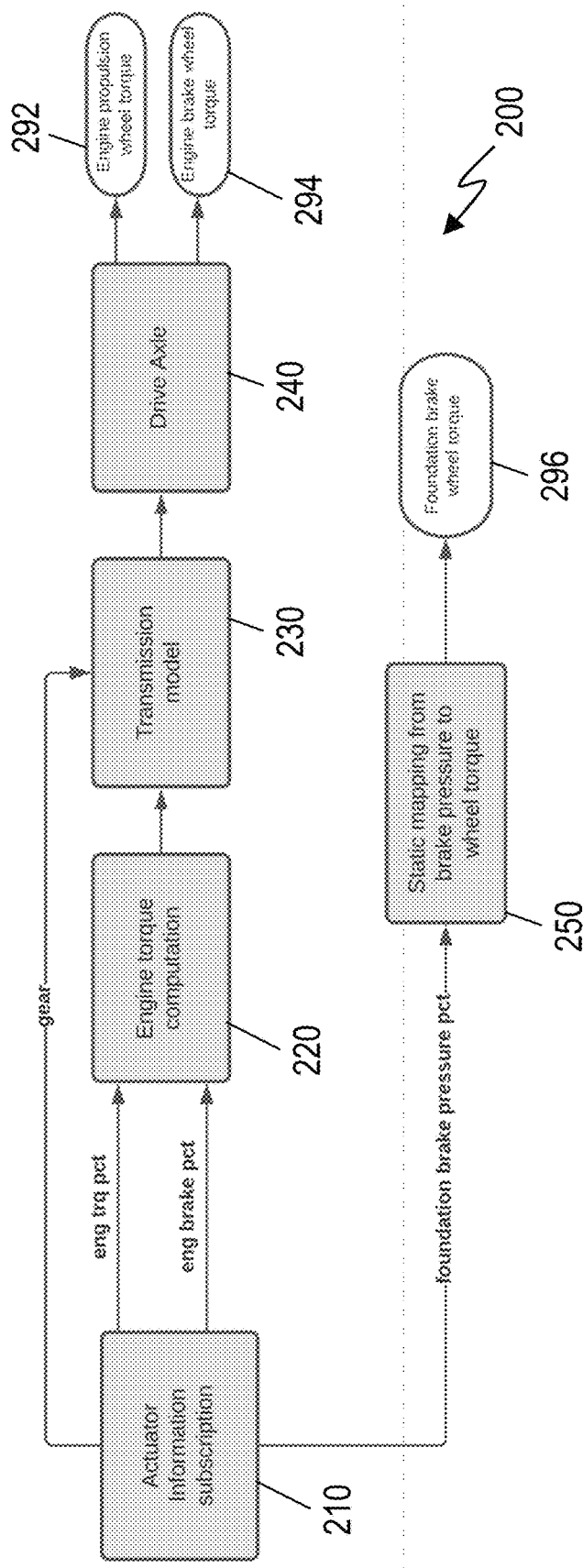
FIG. 2 shows a block diagram of an example actuator model-based approach for wheel torque estimation.

FIG. 2 shows a block diagram of an example actuator model-based approach 200 for wheel torque estimation. As shown therein, the engine propulsion wheel torque (292) and engine brake wheel torque (294) are computed based on an engine torque computation (220), which uses the torque percentage request broadcasted by engine control unit (210). Then transmission model (230) is applied to compute the torque output at the transmission output shaft. The wheel torque is magnified by the final drive ratio through drive axle (240). As for foundation brake wheel torque (296), an offline calibrated steady state model (250) is used to map pressure delivery to wheel torque. This approach is advantageous because the simple model used can be implemented fairly efficiently.

However, this approach is vulnerable to quantization noise due to the limited resolution from the J1939 Controller Area Network (CAN) messages. This can cause noise to the motion control algorithm downstream, especially for over-penalizing torque change rate. The actuator model-based approach does not provide an easy integration for vehicle side measurement and online adaptive vehicle dynamics model. This issue becomes greater concern when it comes to foundation brake wheel torque estimation since the pressure accumulation within brake system pipeline has certain dynamics which cannot ignored in order to meet stop distance accuracy requirements. Vehicle-side dynamic model information may be used to achieve better accuracy of the brake wheel torque. The lack of redundancy is another issue since the estimation is completely dependent on actuator information broadcast on CAN bus. Finally, this approach may use passive filters for noise reduction which can introduce large time delays in state estimation, which can lead to downstream control delays and eventually cause safety concerns in autonomous operation.

Figure 3:
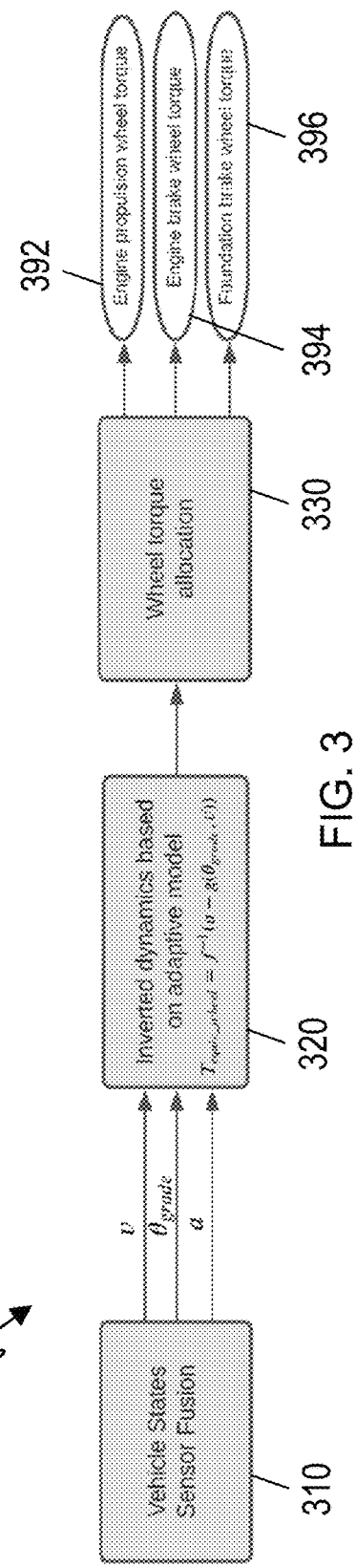
FIG. 3 shows a block diagram of an example dynamics model-based approach for wheel torque estimation.

FIG. 3 shows a block diagram of an example dynamics model-based approach 300 for wheel torque estimation. As shown therein, the engine propulsion wheel torque (392), engine brake wheel torque (394), and foundation brake wheel torque (396) are computed by using the vehicle states sensor fusion (310) as an input to an inverted dynamic model (320), followed by allocating the wheel torque (330), which assumes the torque computed is the summation of torque components from engine propulsion, engine brake and foundation brake. In an example, the dynamic model used is:

$$a = f(T_{wheel}) + g(\theta_{grade}, v). \quad (1)$$

Herein, v and a represent the velocity and acceleration of the vehicle, $T_{wheel}$ is the equivalent wheel torque, and $\theta_{grade}$ is a parameter indicative of the road that the vehicle is moving on. The equivalent wheel torque can be computed based on estimated acceleration and other vehicle states by inverting the dynamic model, e.g., $$T_{equiv\_wheel} = f^{-1}(a - g(\theta_{grade}, v)) \quad (2)$$

It is noted that using this approach is predicated on having a reliable online adaptive longitudinal dynamic model because the vehicle dynamics model varies due to payload and road condition changes in operation. This approach may also require more accurate vehicle speed and acceleration estimates because direct measurement by sensors can be too noisy to use. Therefore, this approach also involves online adaptation of longitudinal model and observer design for state estimation, which increases the complexity of this solution. Different from actuator model approach, this method requires an additional operation to allocate the total wheel torque into propulsion, engine brake and foundation brake related wheel torque components. One of the advantages of this approach is that the estimation is less vulnerable to the actuator feedback resolution limitation.

However, torque computation based on inversion is vulnerable to vehicle state sensing noise, although this can be mitigated with a well-designed observer using Kalman filtering. Secondly, this method relies on the longitudinal dynamic model, and thus, any instability in model adaptation can cause drastic behavior in wheel torque estimation, which can cause negative effect to the controller downstream. This leads to similar redundancy issues similar to the actuator model-based estimation approach. And finally, the relatively large time delay due to the slow vehicle dynamics can cause downstream controller response delay and leads to safety concerns.

2 Dual Kalman Filter-Based Wheel Torque Estimation

Figure 4:
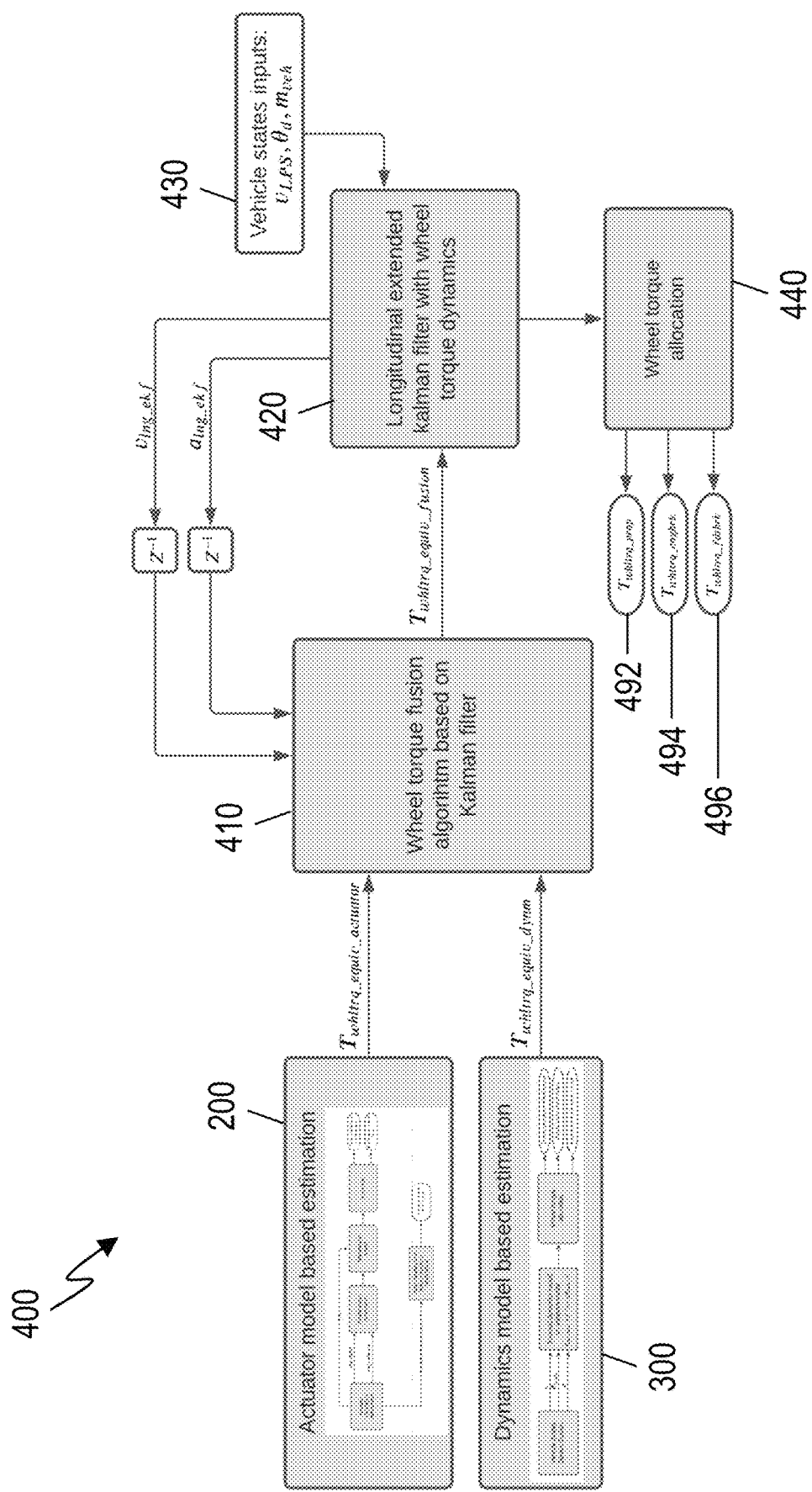
FIG. 4 shows a block diagram for an example dual Kalman filter-based approach for wheel torque estimation.

Embodiments of the disclosed technology leverage both the actuator model-based approach (described in FIG. 2) and the dynamics model-based approach (described in FIG. 3) and use a Kalman filter to fuse the two types of estimated equivalent wheel torque. This approach, shown in FIG. 4, may further include refining the fused estimate of the equivalent wheel torque using an extended Kalman filter (EKF) longitudinal dynamic state estimator, which provides the integration of the vehicle state measurements. The EKF eliminates quantization noise from actuator states and generates more accurate wheel torque estimation that accounts for longitudinal states sensing information. This improves the wheel torque estimation smoothness, which enhances accuracy in wheel torque change rate cost computation for longitudinal dynamic MPC downstream. As shown in FIG. 4, the longitudinal information for the wheel torque fusion logic is obtained from the longitudinal dynamic EKF, which provides estimation feedback to close the loop. This architecture seamlessly integrates wheel torque estimator and vehicle state estimator into a single framework.

Figure 5:
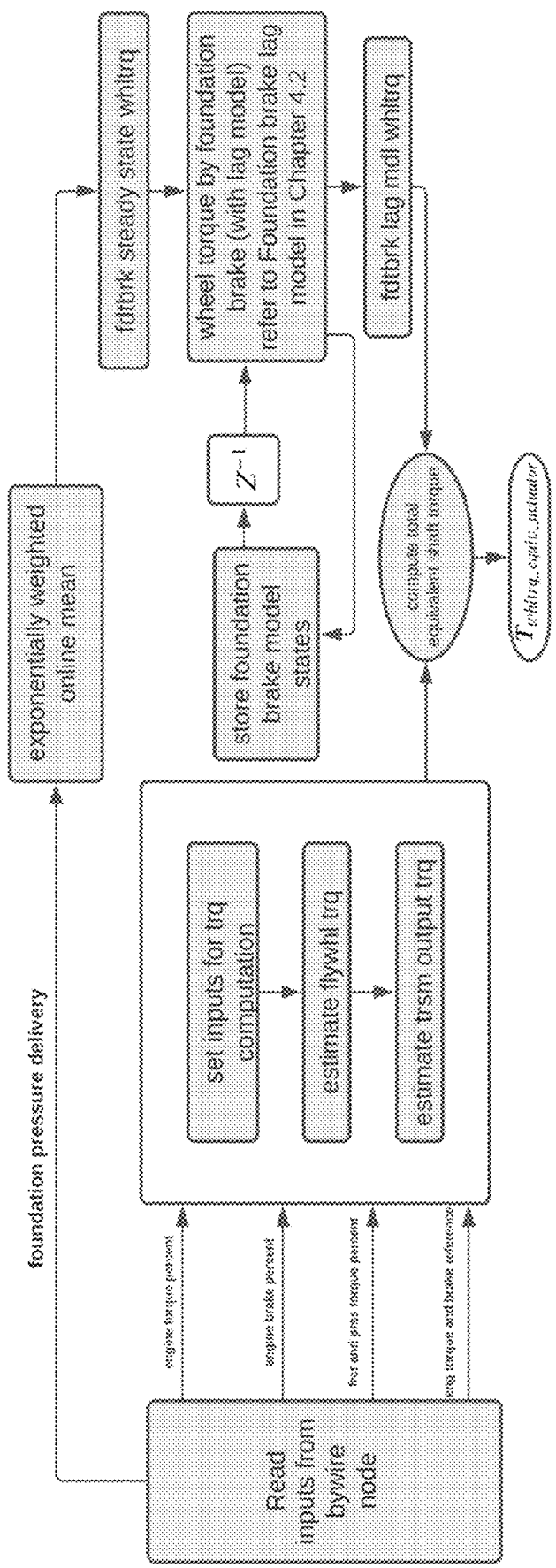
FIG. 5 shows a block diagram for an example actuator model-based wheel torque computation based on the actuator model-based approach shown in FIG. 2.

The dual Kalman filter-based wheel torque estimation approach shown in FIG. 4 includes the actuator mode-based estimation (200), which is further detailed in FIG. 5, and the dynamics model-based estimation (300). The dual Kalman filter-based approach (400) includes a Kalman filter for wheel torque fusion estimation (410) that receives the estimated equivalent wheel torques from the actuator mode-based estimation ($T_{whltrq\_equiv\_actuator}$) and the dynamics model-based estimation ($T_{whltrq\_equiv\_dymn}$), and fuses these estimates to generate a blended (fused) estimate of the wheel torque ($T_{whltrq\_equiv\_fusion}$). This fused estimate is further refined using the extended Kalman filter longitudinal dynamic state estimator (420), which integrates the vehicle state measurements (430). The refined wheel torque estimate is partitioned or allocated (440) into the engine propulsion wheel torque (492), engine brake wheel torque (494), and foundation brake wheel torque (496).

2.1 Torque Estimation from Actuator Model

FIG. 5 shows a block diagram for an example actuator model-based wheel torque computation based on the actuator model-based approach shown in FIG. 2. As shown in FIG. 5, the actuators for the autonomous vehicles considered in this document include the engine and the foundation (air) brake system, which are shown in the left-hand side and right-hand side of FIG. 5, respectively. The engine wheel torque and the foundation brake wheel torque are computed, summed, and provided as an input to wheel torque fusion algorithm (410 in FIG. 4).

2.2 Torque Estimation from Dynamics Model

In some embodiments, the longitudinal model structure is defined in Eq. (3), where $\rho_n$ are scaling factors, $\alpha_n$ are the actual adaptive model parameters, and sfttrq is the shaft torque, which represents the torque before amplification by the final drive ratio passing the drive axle.

$$a = \rho_1 \alpha_1 T_{sfttrq_{equiv}} + \rho_2 \alpha_2 v^2 + \rho_3 \alpha_3 \theta + \rho_4 \alpha_4 \quad (3)$$

$$T_{sfttrq_{equiv}} = T_{whltrq_{equiv}} / \eta_{final\_drive} \quad (4)$$

$$T_{sfttrq_{equiv}} = \frac{a - \rho_2 \alpha_2 v^2 - \rho_4 \alpha_4 \rho_3 \alpha_3 \theta}{\rho_1 \alpha_1}, \text{ assuming } \rho_1 \alpha_1 \neq 0 \quad (5)$$

$$T_{whltrq_{equiv}} = \eta_{final\_drive} T_{sfttrq_{equiv}} \quad (6)$$

It is noted that the shaft torque is used as the torque input for the dynamics equation, but because the shaft and wheel torque differ only by a scalar associated with the final drive ratio, the conversion between the two is straightforward. By inverting the dynamic model following Eq. (5) and using the conversion in Eq. (6), the wheel torque can be obtained. Based on the inverted model in Eq. (5), the backward torque model structure can be determined as shown in Eq. (7), where $\eta_n$ are scaling factors and $\beta_n$ are the adapted model coefficients. In some embodiments, this model and the longitudinal dynamics model are adapted online so that weight change and road surface changes can be accounted for.

$$T_{sfttrq_{equiv}} = \eta_1^3 \beta_1 \alpha + \eta_2^3 \beta_2 v^2 + \eta_3 \beta_3 \tan(\theta) + \eta_4 \beta_4 \quad (7)$$

In some embodiments, the reliability of Eq. (5) or Eq. (7) may be compared to determine which one is to be used, with the decision depending on the current status of the model adaptation.

2.3 Torque Fusion Using the Kalman Filter

The estimated equivalent wheel torques from the actuator mode-based estimation (see § 2.1) and the dynamics model-based estimation (see § 2.2) are fused using a Kalman filter based on the following formulation:

$$a_k = \rho_0 c_{torque} T_{k-1} + \rho_1 c_{v2} v_k^2 + \rho_2 c_{const} + \tan(\theta) c_{grade} \quad (8)$$

$$T_k = \eta_1 \beta_1 \alpha_k + \eta_2 \beta_2 v_k^2 + \eta_3 \beta_3 \tan(\theta) + \eta_4 \beta_4 = f_k(\alpha_k, v_k) \quad (9)$$

$$F_k = \frac{\partial f_k}{\partial T_k} = \eta_1 \beta_1 \rho_0 c_{torque} \quad (10)$$

In Eq. (9) of the above formulation, it is noted that the model does not include the actual dynamics of the wheel torque delivery, and to that end, the acceleration term in Eq. (7) is substituted with Eq. (8) to yield the Jacobian expansion in Eq. (10).

2.4 Torque Refinement Using the Extended Kalman Filter

As described above, the estimated equivalent wheel torques from the actuator mode-based estimation and the dynamics model-based estimation are fused using a Kalman filter and based on calibrated noise matrices. In this stage, the fused (or blended) torque is refined using a torque damped model combined with longitudinal dynamics.

In some embodiments, the longitudinal dynamics are defined using Eq. (12), which are converted to the wheel-domain for the torque term based on model in Eq. (3). In this framework, wheel torque estimation and the vehicle speed are defined as the two states for the extended Kalman filter (EKF).

$$x = \begin{bmatrix} T_{whltrq} \\ v \end{bmatrix} \quad (11)$$

$$\dot{x} = \begin{bmatrix} \tau \dot{T}_{whltrq} \\ \dot{v} \end{bmatrix} = \begin{bmatrix} -T_{whltrq} + u_{whltrq} \\ a_1 T_{whltrq} \rho_1 + b_1 v^2 \rho_2 + d_1 \rho_4 + e_1 \theta \end{bmatrix} \quad (12)$$

In the above formulation, and in some embodiments, the dynamic equation for $T_{whltrq}$ in the first row may be determined offline. For example, it may be interpreted as the damped torque delivery dynamics through the non-rigid mechanical load process to the actual vehicle motion defined by speed (or velocity) and acceleration. One example to support the need of such a model is that during gear shifting, the torque from the powertrain side observes a glitch while the vehicle motion damps out the effect. This indicates that first order dynamics exists for torque delivery. The dynamics for vehicle speed in the second row are derived based on online adapted model in Eq. (8). The Jacobian matrix for the EKF formulation is given in Eq. (14) and can be derived by differentiating the discrete dynamics equations in Eq. (13).

$$\begin{bmatrix} T_k \\ v_k \end{bmatrix} = \begin{bmatrix} A_d T_{k-1} + B_d v_{k-1} \\ d_t(\rho_1 a_1 T_{k-1}) + d_t \rho_2 b_1 v_{k-1}^2 + v_{k-1} + d_t(\rho_4 d_t + e_1 \theta_{k-1}) \end{bmatrix} \quad (13)$$

$$F_k = \begin{bmatrix} \frac{\partial f_1}{\partial T_{k-1}} & \frac{\partial f_1}{\partial v_{k-1}} \\ \frac{\partial f_2}{\partial T_{k-1}} & \frac{f_2}{\partial v_{k-1}} \end{bmatrix} = \begin{bmatrix} A_d & 0 \\ d_t \rho_1 a_1 & 2 d_t \rho_2 b_1 v_{k-1} + 1 \end{bmatrix} \quad (14)$$

3 Allocation of the Estimated Wheel Torque

The refined estimate of the equivalent wheel torque is partitioned (or divided) into torque components based on actuator sources, which can then be used to generate the appropriate control commands. In some embodiments, the components of the equivalent wheel torque, based on actuator source, include the engine propulsion wheel torque ($T_{whltrq\_prop}$), engine brake wheel torque ($T_{whltrq\_engbrk}$), and foundation brake wheel torque ($T_{wheltrq\_fdtbrk}$). In this framework, $T_{whltrq\_prop}$ includes the wheel torque due to engine friction and parasitic drag (denoted $T_{frc\_prss}$), while $T_{whltrq\_engbrk}$ and $T_{wheltrq\_fdtbrk}$ exclude this term. Furthermore, $T_{powertrain}$ is defined as the total torque generated by the engine (which includes $T_{frc\_prss}$) and $T_{whltrq\_ekf}$ represents the equivalent wheel torque estimation from the longitudinal dynamic extended Kalman filter (discussed in § 2.4).

FIG. 6 shows an example algorithm for wheel torque source allocation. As shown therein, the torque terms $T_{powertrain}$, $T_{frc\_prss}$, and $T_{whltrq\_ekf}$ are allocated amongst the engine propulsion wheel torque ($T_{whltrq\_prop}$), engine brake wheel torque ($T_{whltrq\_engbrk}$), and foundation brake wheel torque ($T_{wheltrq\_fdtbrk}$) based on the velocity of the vehicle, the braking mode of the vehicle (e.g., no brakes engaged, engine brake only engaged, foundation brake only engaged, or both engine and foundation brakes engaged), and whether the vehicle is stopped. The allocation algorithm shown in FIG. 6 assumes (a) if only engine propulsion wheel torque ($T_{whltrq\_prop}$) is applied, then the engine brake wheel torque ($T_{whltrq\_engbrk}$) and foundation brake wheel torque ($T_{wheltrq\_fdtbrk}$) are both zero, and (b) if only the foundation brake pressure is above an active threshold based on actuator feedback, then the engine brake wheel torque ($T_{whltrq\_engbrk}$) is zero.

Figure 7:
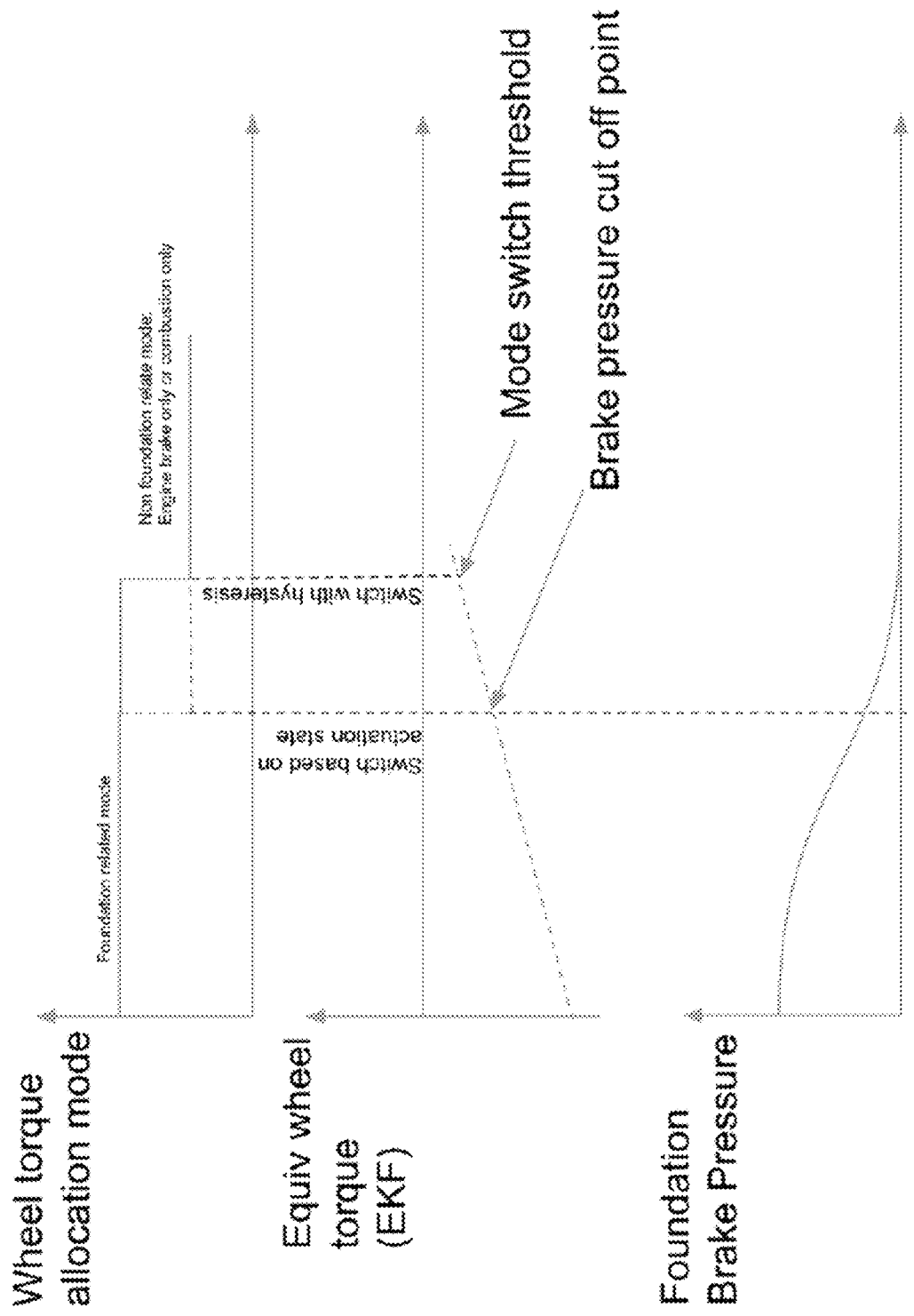
FIG. 7 shows an example of the hysteresis design for mode switching based on the foundation (air) brake status.

In some embodiments, the mode switch logic is augmented with hysteresis to avoid sudden mode switches that may cause abrupt changes in outputs, which can potentially cause glitches in downstream controller outputs. The addition of hysteresis is motivated by the slow decaying behavior of foundation brake pressure after pressure is cut off, as shown in FIG. 7. As shown therein, when a pressure cut off is observed, instead of using foundation brake pressure to determine mode transition, threshold is applied on estimated equivalent wheel torque from longitudinal dynamic EKF. The mode switch threshold for wheel torque is calibrated based on vehicle test data. By adding such hysteresis, the transition between modes becomes smooth and reflects the slow decay dynamics during brake pressure release process.

Figure 8:
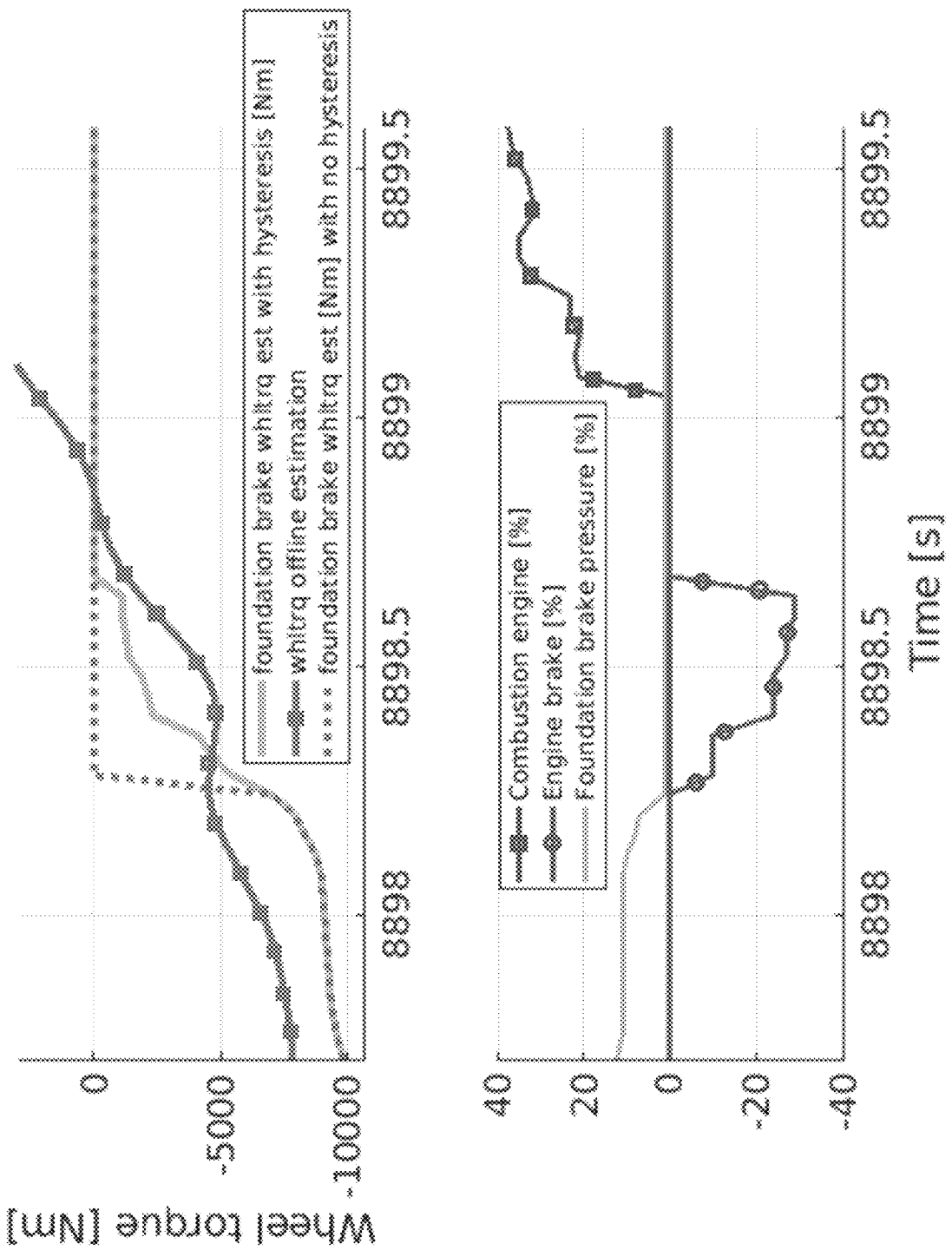
FIG. 8 shows example plots demonstrating the efficacy of the hysteresis design.

The efficacy of the hysteresis design is shown in FIG. 8. The top plot in FIG. 8 shows that without hysteresis considered (the dotted line), the foundation brake wheel torque estimation has a big unrealistic dip, which can impact downstream controller negatively. The line with square markers in the top plot, with hysteresis incorporated during the foundation brake to engine brake mode transition, provides a more reasonable foundation brake wheel torque estimation that is much closer to the solid line curve (semi-ground truth of actual wheel torque obtained by postprocessing). The addition of hysteresis can advantageously benefit controller performance in deceleration events. The bottom plot shows the corresponding time-series plots for the combustion engine, engine brake, and foundation brake pressure.

3.1 Stop Condition with Static Friction

Figure 9:
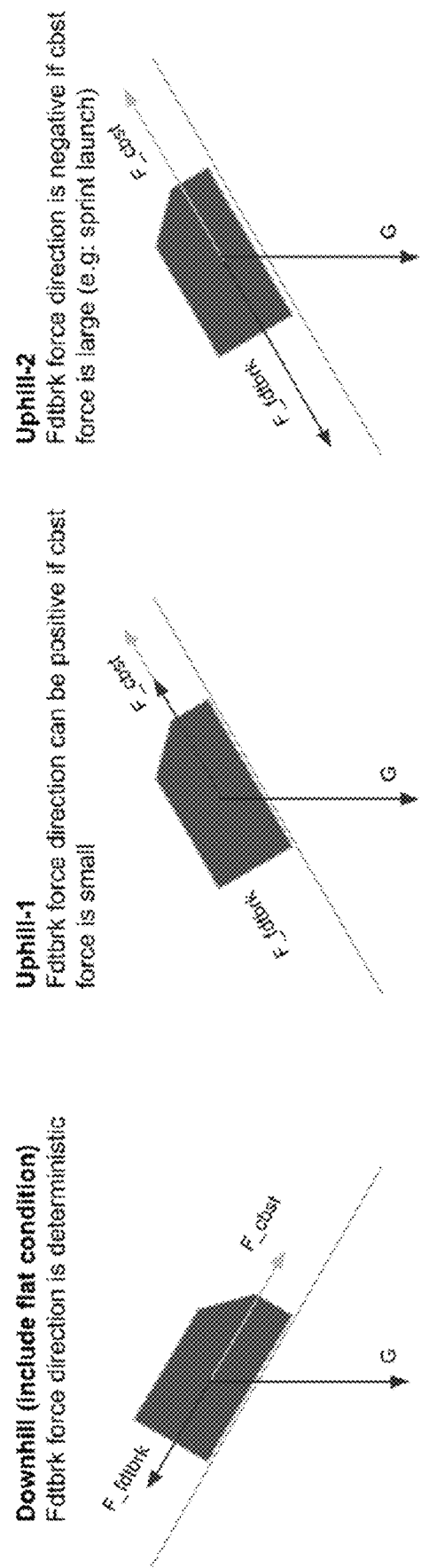
FIG. 9 shows diagrams for example stop conditions for wheel torque derivation.

FIG. 9 shows free-body diagrams for all stop conditions in which an autonomous vehicle is subject to static friction, and in mode 5 in FIG. 6, wherein all the equivalent wheel torque is allocated to the engine propulsion wheel torque ($T_{whltrq\_prop}$) It is noted that refining the equivalent wheel torque in these scenarios is equivalent to using the longitudinal model-based wheel torque estimation by having acceleration and speed to be zero. Embodiments of disclosed technology advantageously enable the wheel torque to be estimated accurately in these stop conditions, which enables an autonomous vehicle to be able to perform a "sprint launch" (as shown in the rightmost case in FIG. 9).

4 Validation of the Efficacy of the Disclosed Technology

Figure 10:
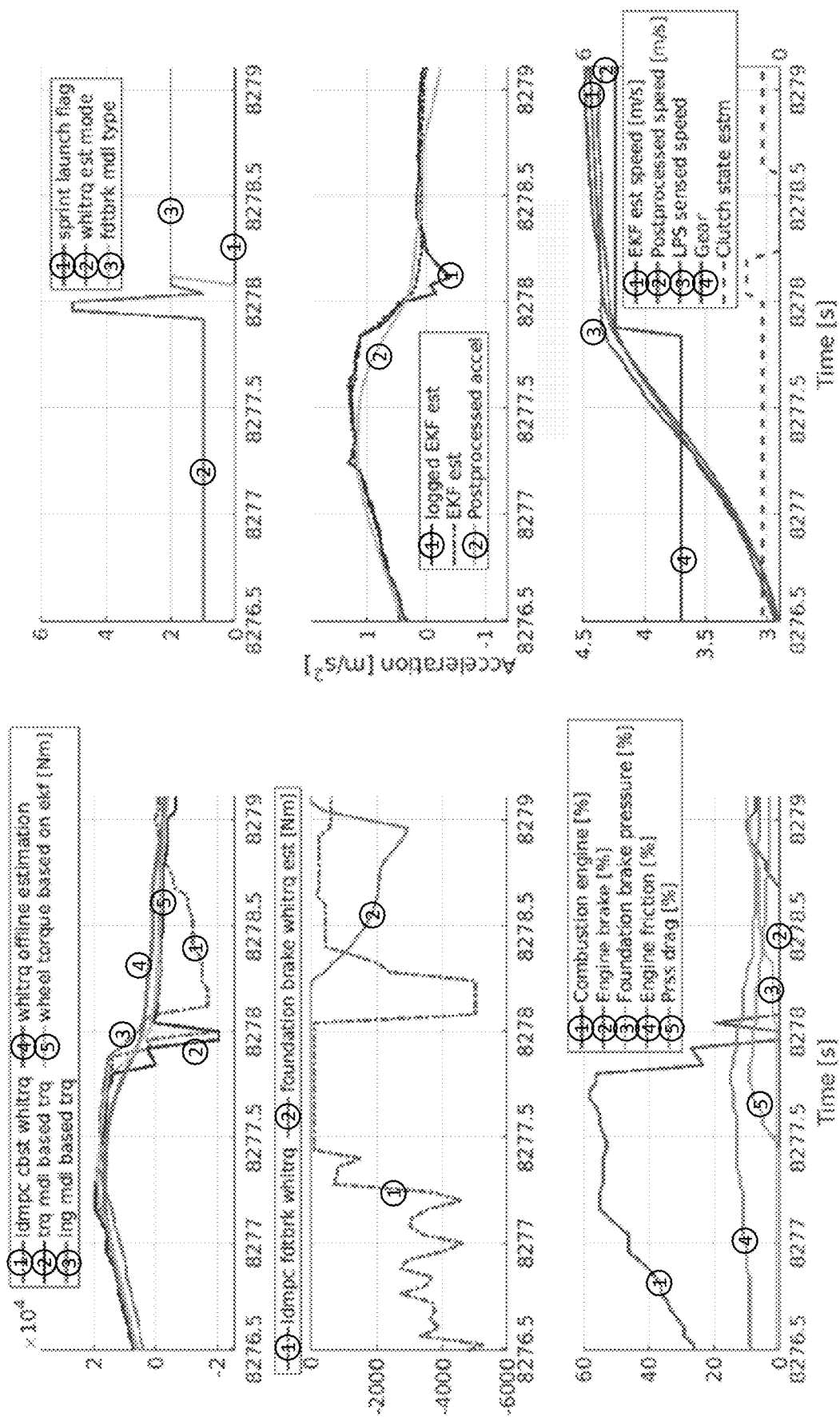
FIG. 10 shows example plots for the elimination of sensing glitches during gear shifting.

As discussed above, one of benefits of having the actuator and dynamics model estimation combined is the elimination of error due to glitches in actuator model-based wheel torque estimation, which often happens during gear shifting events. This improvement is shown in FIG. 10 at the 8278 second mark. In the left top plot, for conventional approach using actuator model to compute wheel torque (curve 2; labeled as trq mdl based trq), the glitch is observed due to the over estimation in driveline friction. The dual Kalman filter wheel torque estimation successfully eliminates the unrealistic glitch (curve 5; labeled as wheel torque based on ekf [Nm]). The estimation is also much closer to the semi-ground truth wheel torque estimation (curve 4; labeled as whltrq offline estimation). This glitch rejection is benefited from leveraging dynamics model estimation input. As a result, in the middle right plot, the longitudinal dynamic EKF estimated acceleration manages to reject the estimation glitch from the actuator model input, which improves the state estimation quality. This improvement benefits a downstream controller, which can avoid an overreaction during gear shifting. Another benefit is noise reduction in the event of a sensor failure.

Figure 11:
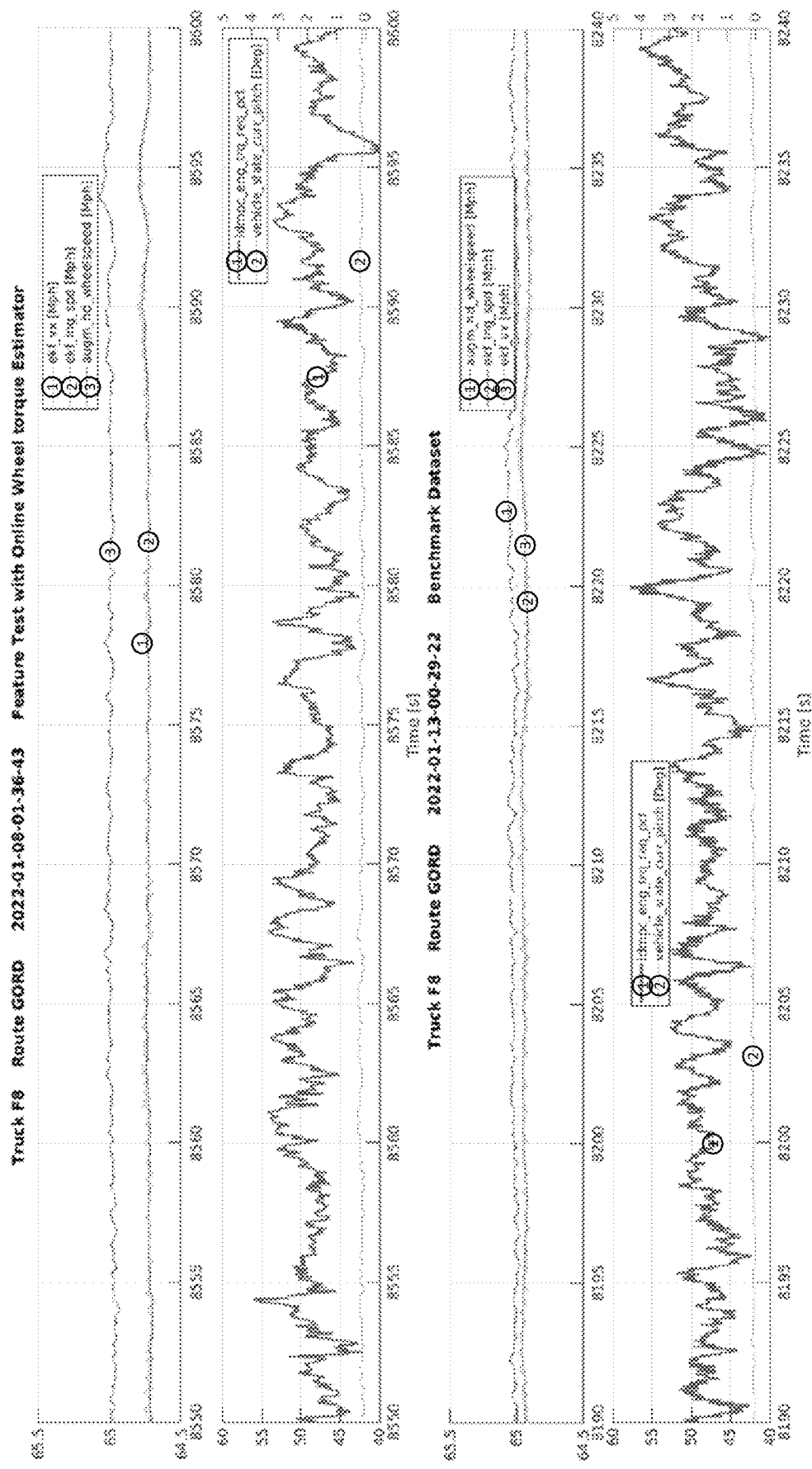
FIG. 11 shows example plots demonstrating the efficacy of smoothening the controller demand.
Figure 12:
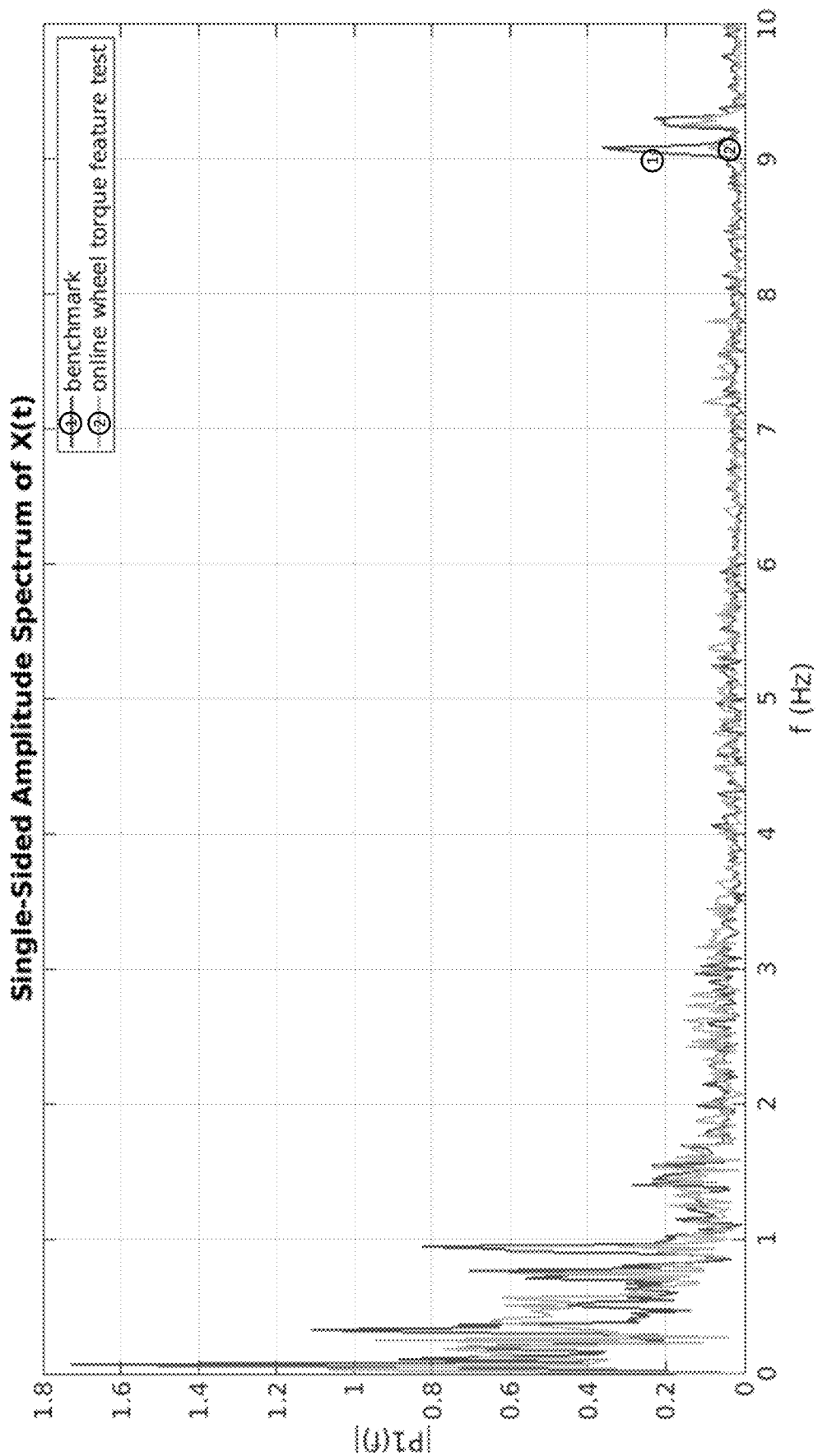
FIG. 12 shows an example comparison of frequency content of the controller demand between using a conventional wheel torque estimator and the described embodiments.

Yet another benefit of the dual Kalman filter framework described is improving the smoothness of the controller demand, which is reflected in the fuel economy benefit. The efficacy of the described embodiments is evidenced in FIG. 11, which compares a highway cruise scenario for an autonomous truck using conventional estimator (bottom plots in FIG. 11) and embodiments of the disclosed technology (top plots in FIG. 11). A visual comparison of the plots shows the efficacy of the described embodiments. Furthermore, the frequency content of the controller demands is compared in FIG. 12. As shown therein, the dual Kalman filter framework significantly reduces the high frequency content around 9 Hz, which supports the visual comparison of the plots in FIG. 11.

5 Embodiments and Implementations of the Disclosed Technology

Embodiments of the disclosed technology provide, inter alia, the following features, benefits, and advantages:

- Provides all the state estimation and wheel torque estimation for the ecosystem including the wheel torque domain based longitudinal motion control development;
- Integrates wheel torque estimation and vehicle dynamic state estimation into a single framework (e.g., using the extended Kalman filter);
- Provides a framework for combining measurements from an actuator model-based approach and a vehicle dynamics model-based approach for state estimation and wheel torque estimation;
- Eliminates the quantization noise from the actuator model without using passive filters (e.g., using the longitudinal dynamic extended Kalman filter);
- Enhances redundancy by adding more capability to maintain reasonable state estimates even with sensor failures from one side (e.g., by combining both wheel torque estimation from the actuator model and the longitudinal model);
- Incorporates a given actuator dynamic model into wheel torque and state estimation, e.g., embedding brake system lag model;
- Reduces the time delay in state estimation compared to passive filters (e.g., a low pass filter) while simultaneously achieving noise reduction; and
- Smooths the downstream motion controller output, which benefits fuel economy and adds to cost reduction in autonomous operation.

Figure 13:
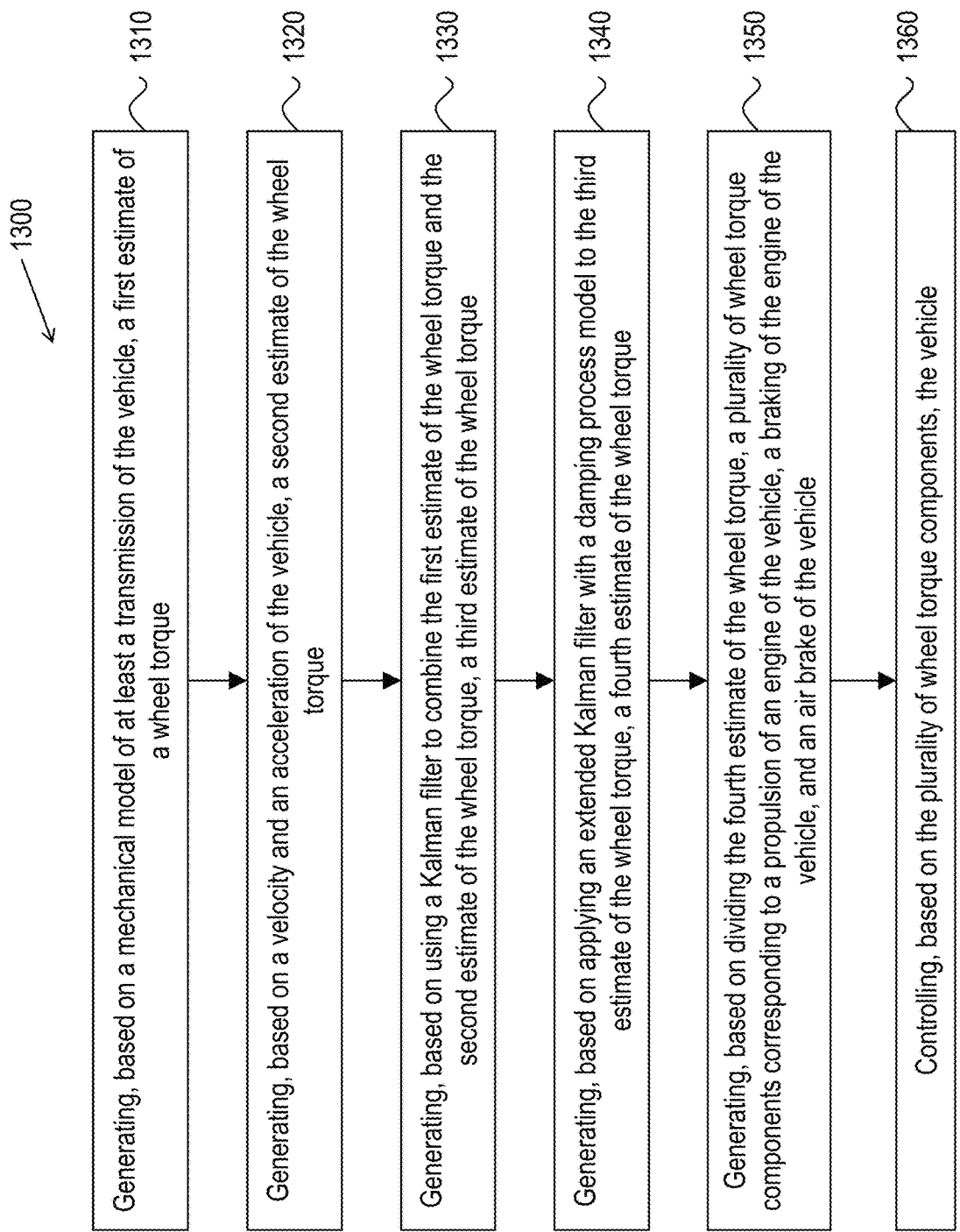
FIGS. 13-16 show flowcharts of examples methods of controlling a vehicle.

FIG. 13 shows a flowchart for an example method 1300 for controlling a vehicle. The method 1300 includes, at operation 1310, generating, based on a mechanical model of at least a transmission of the vehicle, a first estimate of a wheel torque. In some embodiments, the mechanical model is the actuator model shown in FIG. 2 and/or FIG. 5. In various embodiments, the mechanical model may provide a set of equations that provide a functional relationship between torque applied to a wheel and the corresponding response by the vehicle. The mechanical model may, for example, depend on a powertrain of the vehicle. In some embodiments, the mechanical model may be represented as a look-up-table of input values of torque and output values of braking performance.

The method 1300 includes, at operation 1320, generating, based on a velocity and an acceleration of the vehicle, a second estimate of the wheel torque.

The method 1300 includes, at operation 1330, generating, based on using a Kalman filter (e.g., described in § 2.3) to combine the first estimate of the wheel torque and the second estimate of the wheel torque, a third estimate of the wheel torque.

The method 1300 includes, at operation 1340, generating, based on applying an extended Kalman filter (e.g., described in § 2.4) to the third estimate of the wheel torque, a fourth estimate of the wheel torque.

The method 1300 includes, at operation 1350, generating, based on dividing the fourth estimate of the wheel torque (e.g., described in § 3), a plurality of wheel torque components corresponding to a propulsion of an engine of the vehicle, a braking of the engine of the vehicle, and an air brake of the vehicle.

The method 1300 includes, at operation 1360, controlling, based on the plurality of wheel torque components, the vehicle.

In some embodiments, the first estimate of the wheel torque comprises a sum of an engine wheel torque and a foundation brake wheel torque. The engine wheel torque may represent, for example, an amount of torque that is exerted on the engine to reduce rotational speed of the engine. The foundation brake wheel torque may represent, for example, an amount of torque that is to be exerted on a foundation brake (e. g., a brake that uses air brake chambers and a linkage to press brake shoes against a surface of the brake drum) to achieve a certain braking performance.

In some embodiments, generating the second estimate of the wheel torque is further based on a weight of the vehicle and a grade of a road beneath the vehicle.

In some embodiments, generating the second estimate of the wheel torque is based on inverting a dynamic model of the vehicle, and wherein an input to the dynamic model comprises a shaft torque prior to amplification by a final drive ratio.

In some embodiments, a prediction noise matrix, and a measurement noise matrix of the Kalman filter are calibrated based on test data generated by the vehicle for varying values of the wheel torque.

In some embodiments, the extended Kalman filter is configured with a first state for the wheel torque and a second state for the velocity of the vehicle.

Figure 14:
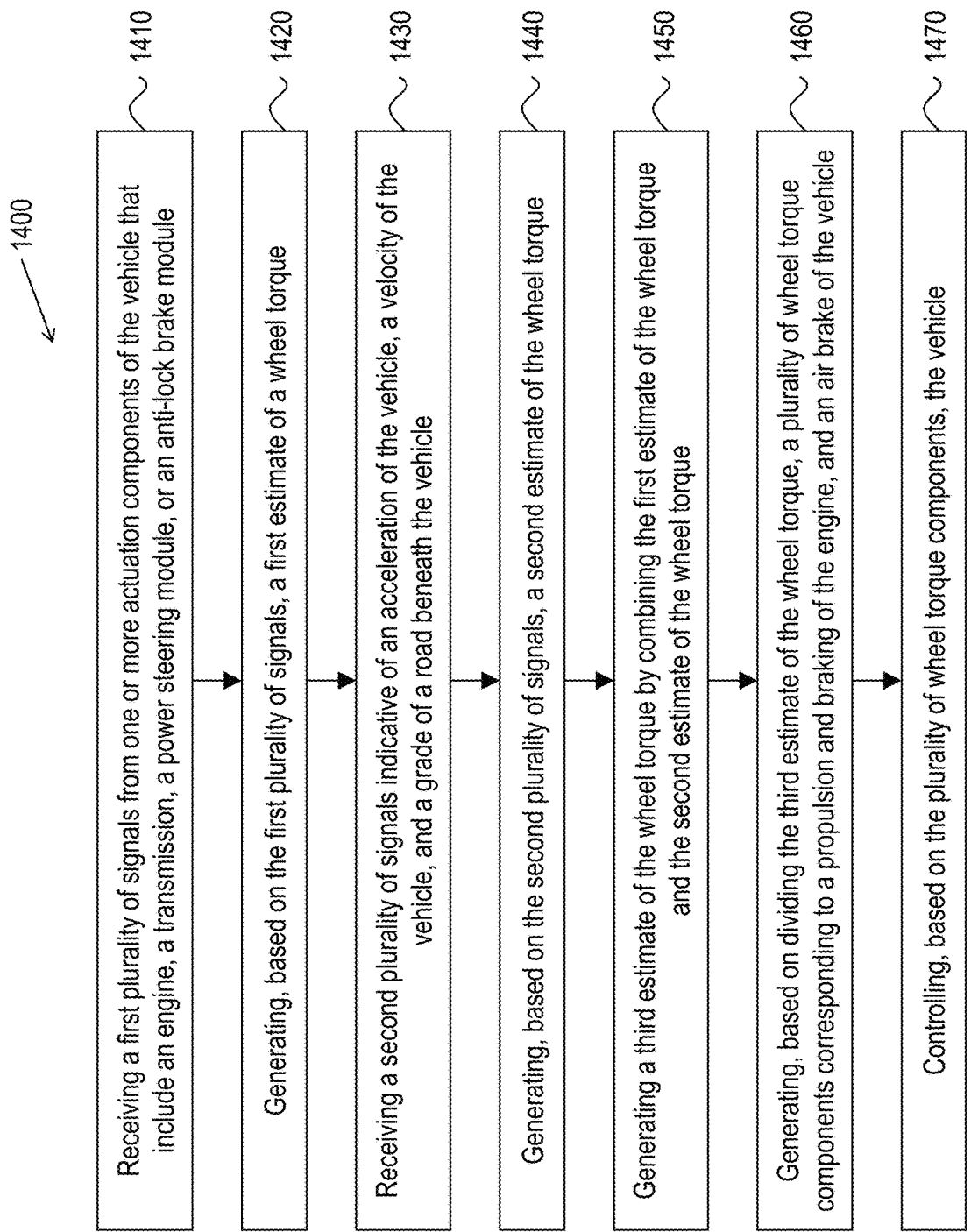

In some embodiments, the extended Kalman filter is further configured to model torque damping and longitudinal dynamics of the vehicle. In some embodiments, torque damping represents a behavior of torque over a time period in which the initially applied torque value goes through transient ups and downs, eventually settling to a steady state value. In some embodiments, longitudinal dynamics of the vehicle may include modeling of engine behavior, tire tractive forces, resistive forces acting on the vehicle, gear-shifting efficiency, and so on, FIG. 14 shows a flowchart for an example method 1400 for controlling a vehicle. The method 1400 includes, at operation 1410, receiving a first plurality of signals from one or more actuation components of the vehicle that include an engine, a transmission, a power steering module, or an anti-lock brake module.

The method 1400 includes, at operation 1420, generating, based on the first plurality of signals, a first estimate of a wheel torque.

The method 1400 includes, at operation 1430, receiving a second plurality of signals indicative of an acceleration of the vehicle, a velocity of the vehicle, and a grade of a road beneath the vehicle.

The method 1400 includes, at operation 1440, generating, based on the second plurality of signals, a second estimate of the wheel torque.

The method 1400 includes, at operation 1450, generating a third estimate of the wheel torque by combining the first estimate of the wheel torque and the second estimate of the wheel torque (e.g., as described in § 2.3).

The method 1400 includes, at operation 1460, generating, based on dividing the third estimate of the wheel torque, a plurality of wheel torque components corresponding to a propulsion of the engine, a braking of the engine, and an air brake of the vehicle. For example, braking of the engine may be achieved using a technique commonly known as jake braking.

The method 1400 includes, at operation 1470, controlling, based on the plurality of wheel torque components, the vehicle.

In some embodiments, the first plurality of signals comprises Controller Area Network (CAN) messages.

In some embodiments, the dividing the third estimate of the wheel torque is based on a parasitic friction in engine torque, a braking mode of the vehicle, and the velocity of the vehicle. In other embodiments, the braking mode of the vehicle is selected from the group consisting of a no brake mode, an engine brake only mode, a foundation brake only mode, and an engine brake and foundation brake mode. In some embodiments, an engine may experience two different types of frictional losses—one due to friction among mechanical parts such as gears and bearings and the other due to friction within viscous material (e.g., engine oil) within the engine. In some cases, the latter may be called "parasitic drag" on the engine.

Figure 15:
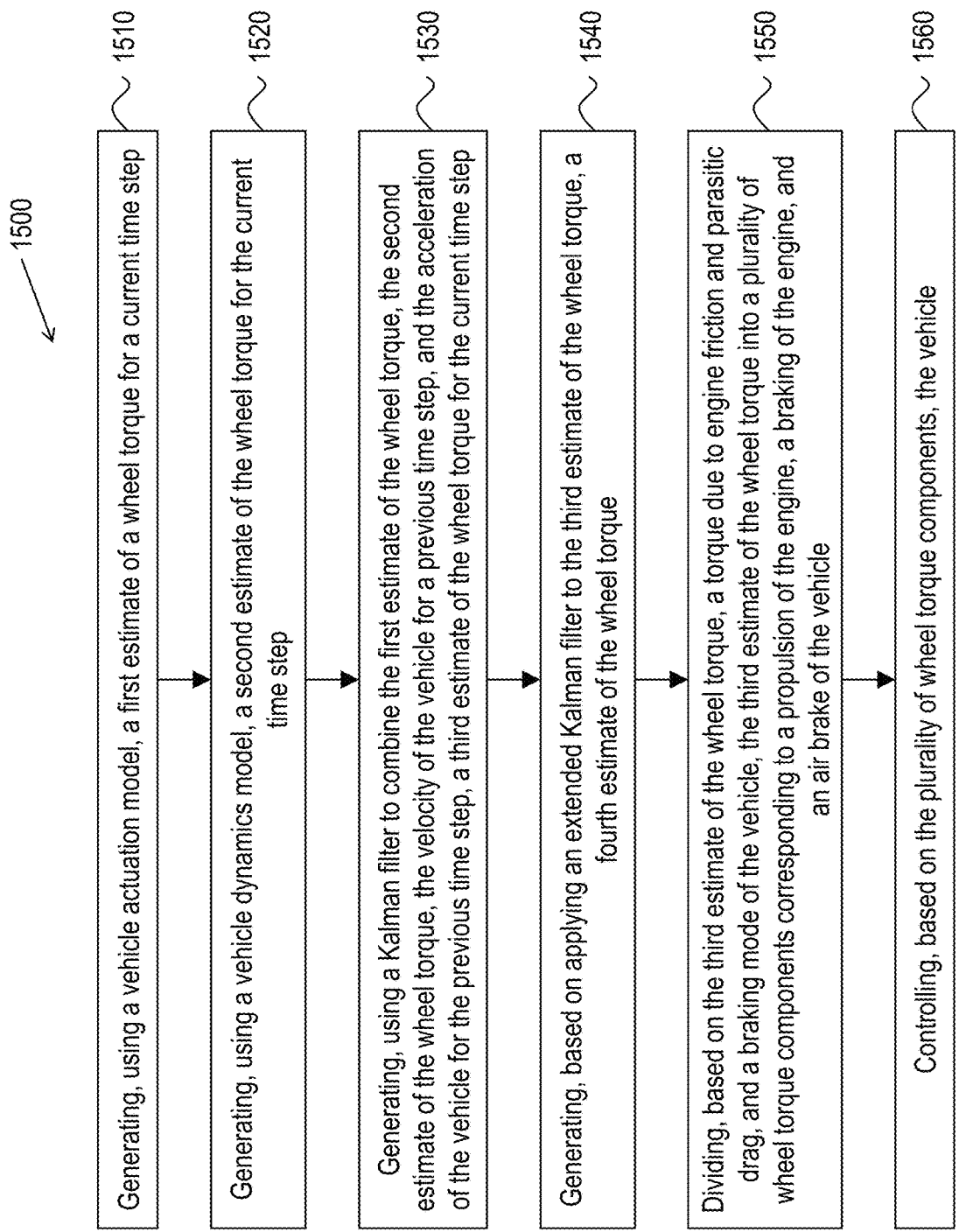

FIG. 15 shows a flowchart for an example method 1500 for controlling a vehicle. The method 1500 can be implemented as one or more computer program products, e.g., one or more modules of computer program instructions encoded on a tangible and non-transitory computer readable medium for execution by, or to control the operation of, data processing apparatus. The method 1500 includes, at operation 1510, generating, using a vehicle actuation model (e.g., as shown in FIG. 2), a first estimate of a wheel torque for a current time step, the vehicle actuation model being based on an engine torque computation, a transmission model, a drive axle model, and a steady-state model for an air brake of the vehicle.

The method 1500 includes, at operation 1520, generating, using a vehicle dynamics model (e.g., as shown in FIG. 3), a second estimate of the wheel torque for the current time step, the vehicle dynamics model being based on a velocity of the vehicle and an acceleration of the vehicle.

The method 1500 includes, at operation 1530, generating, using a Kalman filter to combine the first estimate of the wheel torque, the second estimate of the wheel torque, the velocity of the vehicle for a previous time step, and the acceleration of the vehicle for the previous time step, a third estimate of the wheel torque for the current time step.

The method 1500 includes, at operation 1540, generating, based on applying an extended Kalman filter to the third estimate of the wheel torque, a fourth estimate of the wheel torque, wherein the extended Kalman filter comprises a first state for the wheel torque and a second state for the velocity of the vehicle.

The method 1500 includes, at operation 1550, dividing, based on the third estimate of the wheel torque, a torque due to engine friction and parasitic drag, and a braking mode of the vehicle, the third estimate of the wheel torque into a plurality of wheel torque components corresponding to a propulsion of the engine, a braking of the engine, and an air brake of the vehicle.

The method 1500 includes, at operation 1560, controlling, based on the plurality of wheel torque components, the vehicle.

Figure 16:
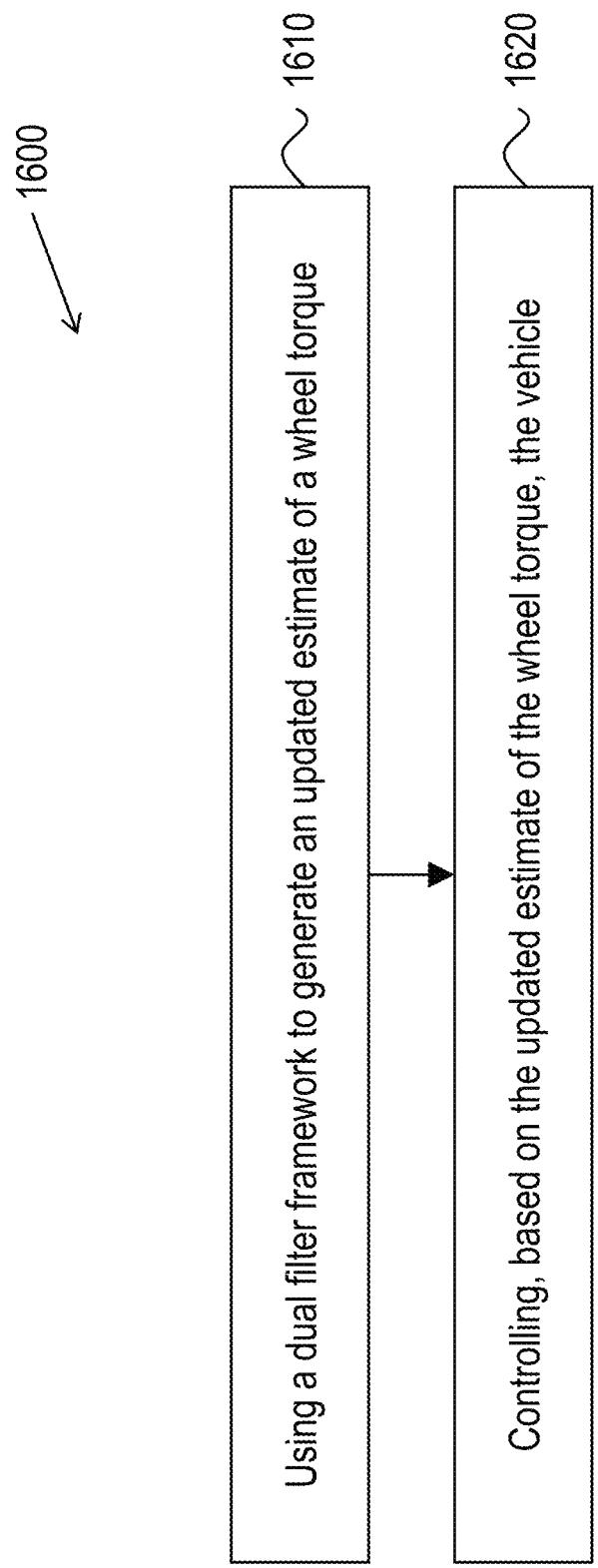

FIG. 16 shows a flowchart for an example method 1600 for controlling a vehicle. The method 1600 can be implemented as one or more computer program products, e.g., one or more modules of computer program instructions encoded on a tangible and non-transitory computer readable medium for execution by, or to control the operation of, data processing apparatus. The method 1600 includes, at operation 1610, using a dual filter framework to generate an updated estimate of a wheel torque.

The method 1600 includes, at operation 1620, controlling, based on the updated estimate of the wheel torque, the vehicle.

In some embodiments, a first filter of the dual filter framework is configured to generate a blended estimate of the wheel torque by combining (a) a first estimate of the wheel torque that is generated based a mechanical model of at least a transmission of the vehicle and (b) a second estimate of wheel torque that is generated based on an inverted longitudinal dynamic model that is a function of the velocity of the vehicle and the acceleration of the vehicle, and the second non-linear filter of the dual filter framework is configured to generate the updated estimate of the wheel torque and an updated estimate of the velocity of the vehicle by filtering the blended estimate of the wheel torque with the measurement of vehicle velocity.

In some embodiments, the first filter is a Kalman filter that is configured to use the second estimate of the wheel torque as the state of the Kalman filter and the first estimate of the wheel torque as the measurement in the Kalman filter.

In some embodiments, the second filter is an extended Kalman filter that comprises a first state for the wheel torque and a second state for the velocity of the vehicle.

In the above-described methods and embodiments, the vehicle is an autonomous vehicle is operating in a Society of Automotive Engineers (SAE) Level 4 (L4) automation mode. Alternatively, the vehicle is operating in an SAE Level 1 (L1) automation mode through an SAE Level 3 (L3) automation mode.

In some embodiments, an apparatus for an autonomous driving vehicle may include at least one processor and a memory that stores execution instructions. The instructions, upon execution by the at least one processor, cause the apparatus to perform a method including: generating, using a vehicle actuation model, a first estimate of a wheel torque for a current time step, wherein the vehicle actuation model is based on an engine torque computation, a transmission model, a drive axle model, and a pressure-to-torque delivery steady-state model for an air brake of the vehicle; generating, using a vehicle dynamics model, a second estimate of the wheel torque for the current time step, wherein the vehicle dynamics model is based on a velocity of the vehicle and an acceleration of the vehicle; generating, using a Kalman filter to combine the first estimate of the wheel torque, the second estimate of the wheel torque, the velocity of the vehicle for a previous time step, and the acceleration of the vehicle for the previous time step, a third estimate of the wheel torque for the current time step; generating, based on applying an extended Kalman filter to the third estimate of the wheel torque, a fourth estimate of the wheel torque, wherein the extended Kalman filter comprises a first state for the wheel torque and a second state for the velocity of the vehicle; dividing, based on the third estimate of the wheel torque, a torque due to engine friction and parasitic drag, and a braking mode of the vehicle, the third estimate of the wheel torque into a plurality of wheel torque components corresponding to a propulsion of the engine, a braking of the engine, and an air brake of the vehicle; and controlling, based on the plurality of wheel torque components, the vehicle. Additionally, or alternatively, the apparatus may implement methods described throughout the present document.

Figure 17:
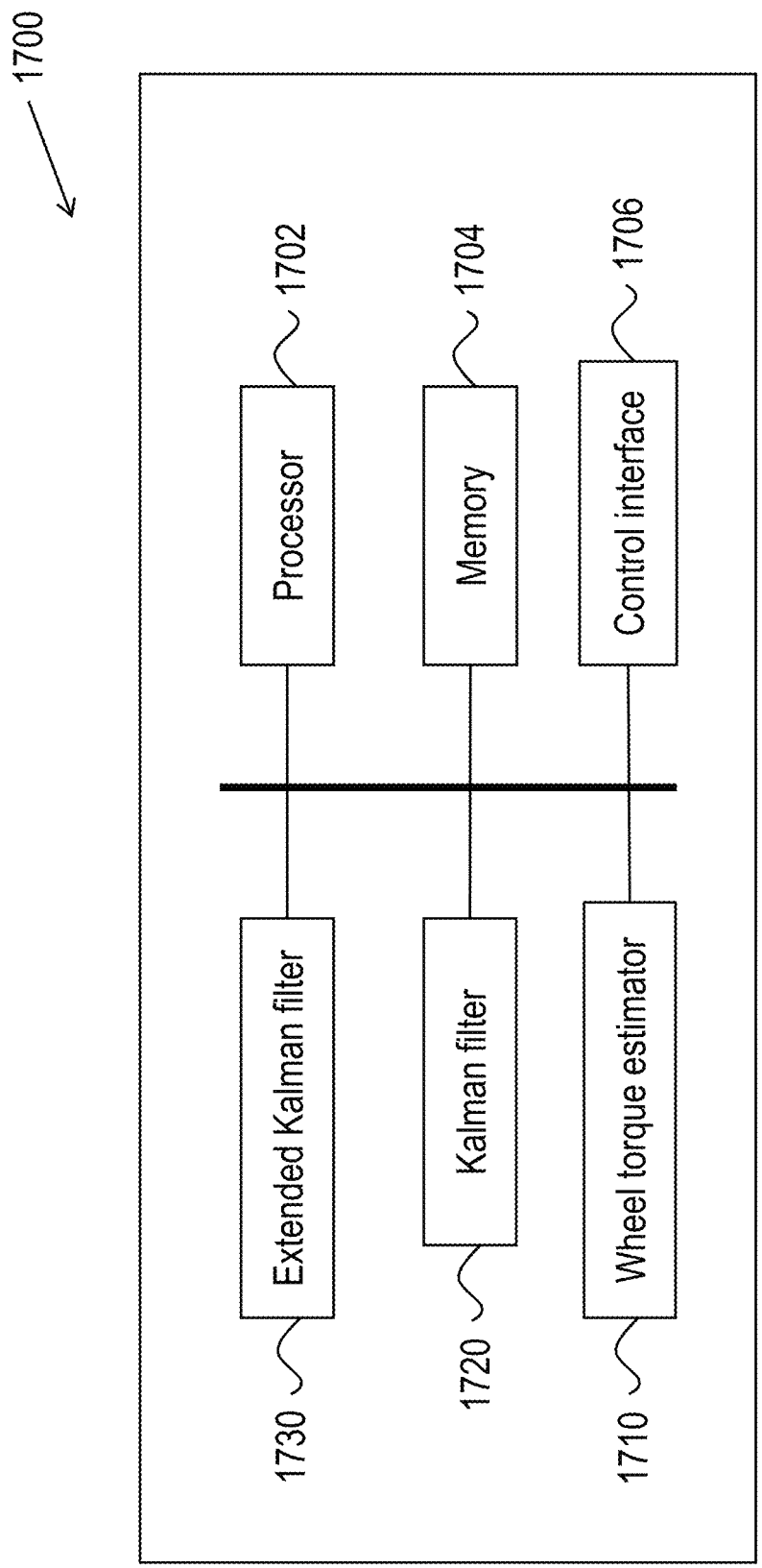
FIG. 17 shows an example of a hardware platform that can implement some methods and techniques described in the present document.

FIG. 17 shows an example of a hardware platform 1700 that can be used to implement some of the techniques described in the present document. For example, the hardware platform 1700 may implement methods 1300-1600 or may implement the various modules described herein. The hardware platform 1700 may include a processor 1702 that can execute code to implement a method. The hardware platform 1700 may include a memory 1704 that may be used to store processor-executable code and/or store data. The hardware platform 1700 may further include a control interface 1706. For example, the control interface 1706 may implement one or more intra-vehicular communication protocols. The hardware platform may further include a wheel torque estimator 1710, a Kalman filter 1720, and an extended Kalman filter 1730. In some embodiments, some portion or all of the wheel torque estimator 1710, the Kalman filter 1720, and/or the extended Kalman filter 1730 may be implemented in the processor 1702. In other embodiments, memory 1704 may comprise multiple memories, some of which are used exclusively by the wheel torque estimator, the Kalman filter, and/or the extended Kalman filter.

Various solutions provided to address the above-discussed technical problems include following solutions preferably incorporated in embodiments.

1. A method for controlling a vehicle, comprising: generating, based on a mechanical model of at least a transmission of the vehicle, a first estimate of a wheel torque; generating, based on a velocity and an acceleration of the vehicle, a second estimate of the wheel torque; generating, based on using a Kalman filter to combine the first estimate of the wheel torque and the second estimate of the wheel torque, a third estimate of the wheel torque; generating, based on applying an extended Kalman filter with a damping process model to the third estimate of the wheel torque, a fourth estimate of the wheel torque; generating, based on dividing the fourth estimate of the wheel torque, a plurality of wheel torque components corresponding to a propulsion of an engine of the vehicle, a braking of the engine of the vehicle, and an air brake of the vehicle; and controlling, based on the plurality of wheel torque components, the vehicle.

2. The method of solution 1, wherein the first estimate of the wheel torque comprises a sum of an engine wheel torque and a foundation brake wheel torque.

3. The method of solution 1, wherein generating the second estimate of the wheel torque is further based on a weight of the vehicle and a grade of a road beneath the vehicle.

4. The method of solution 1, wherein generating the second estimate of the wheel torque is based on inverting a dynamic model of the vehicle, and wherein an input to the dynamic model comprises a shaft torque prior to amplification by a final drive ratio.

5. The method of solution 1, wherein a prediction noise matrix and a measurement noise matrix of the Kalman filter are calibrated based on test data generated by the vehicle for varying values of the wheel torque.

6. The method of solution 1, wherein the extended Kalman filter (EKF) is configured with a first state for the wheel torque and a second state for the velocity of the vehicle.

7. The method of solution 6, wherein the EKF is further configured to model torque damping and longitudinal dynamics of the vehicle.

8. A method of controlling a vehicle, comprising: receiving a first plurality of signals from one or more actuation components of the vehicle that include an engine, a transmission, a power steering module, or an anti-lock brake module; generating, based on the first plurality of signals, a first estimate of a wheel torque; receiving a second plurality of signals indicative of an acceleration of the vehicle, a velocity of the vehicle, and a grade of a road beneath the vehicle; generating, based on the second plurality of signals, a second estimate of the wheel torque; generating a third estimate of the wheel torque by combining the first estimate of the wheel torque and the second estimate of the wheel torque; generating, based on dividing the third estimate of the wheel torque, a plurality of wheel torque components corresponding to a propulsion of the engine, a braking of the engine, and an air brake of the vehicle; and controlling, based on the plurality of wheel torque components, the vehicle.

9. The method of solution 8, wherein the first plurality of signals comprises Controller Area Network (CAN) messages.

10. The method of solution 8, wherein the dividing the third estimate of the wheel torque is based on a parasitic friction in engine torque, a braking mode of the vehicle, and the velocity of the vehicle.

11. The method of solution 10, wherein the braking mode of the vehicle is selected from the group consisting of a no brake mode, an engine brake only mode, a foundation brake only mode, and an engine brake and foundation brake mode.

12. A method of controlling a vehicle, comprising: generating, using a vehicle actuation model, a first estimate of a wheel torque for a current time step, wherein the vehicle actuation model is based on an engine torque computation, a transmission model, a drive axle model, and a pressureto-torque delivery steady-state model for an air brake of the vehicle; generating, using a vehicle dynamics model, a second estimate of the wheel torque for the current time step, wherein the vehicle dynamics model is based on a velocity of the vehicle and an acceleration of the vehicle; generating, using a Kalman filter to combine the first estimate of the wheel torque, the second estimate of the wheel torque, the velocity of the vehicle for a previous time step, and the acceleration of the vehicle for the previous time step, a third estimate of the wheel torque for the current time step; generating, based on applying an extended Kalman filter to the third estimate of the wheel torque, a fourth estimate of the wheel torque, wherein the extended Kalman filter comprises a first state for the wheel torque and a second state for the velocity of the vehicle; dividing, based on the third estimate of the wheel torque, a torque due to engine friction and parasitic drag, and a braking mode of the vehicle, the third estimate of the wheel torque into a plurality of wheel torque components corresponding to a propulsion of the engine, a braking of the engine, and an air brake of the vehicle; and controlling, based on the plurality of wheel torque components, the vehicle.

13. A method of controlling a vehicle, comprising: using a dual filter framework to generate an updated estimate of a wheel torque; and controlling, based on the updated estimate of the wheel torque, the vehicle, wherein a first filter of the dual filter framework is configured to generate a blended estimate of the wheel torque by combining (a) a first estimate of the wheel torque that is generated based a mechanical model of at least a transmission of the vehicle and (b) a second estimate of wheel torque that is generated based on an inverted longitudinal dynamic model that is a function of a velocity of the vehicle and an acceleration of the vehicle, and wherein the second non-linear filter of the dual filter framework is configured to generate the updated estimate of the wheel torque and an updated estimate of the velocity of the vehicle by filtering the blended estimate of the wheel torque with a measurement of the velocity.

14. The method of solution 13, wherein the second filter is an extended Kalman filter that comprises a first state for the wheel torque and a second state for the velocity of the vehicle.

15. The method of any of solutions 1 to 14, wherein the vehicle is an autonomous vehicle is operating in a Society of Automotive Engineers (SAE) Level 4 (L4) automation mode.

16. The method of any of solutions 1 to 14, wherein the vehicle is an autonomous vehicle is operating in one of a Society of Automotive Engineers (SAE) Level 1 (L1) automation mode through an SAE Level 3 (L3) automation mode.

17. An apparatus for controlling a vehicle, comprising: a processor; and a memory, coupled to the processor, comprising instructions, wherein the instructions upon execution by the processor causing the processor to implement one or more methods of solutions 1 to 16.

18. A method or system for estimating a wheel torque of a vehicle, based on a dual Kalman filter framework, as described in this document.

U.S. patent application Ser. No. 18/341,560, claiming benefit of priority to U.S. Provisional Patent Application 63/367,110, is being concurrently filed with the present document and is incorporated herein in its entirety. The aforementioned patent document provides techniques for predictive anti-lag braking control for autonomous driving.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for controlling a vehicle, comprising:
generating, based on a mechanical model of at least a transmission of the vehicle, a first estimate of a wheel torque;
generating, based on a velocity and an acceleration of the vehicle, a second estimate of the wheel torque;
generating, based on using a Kalman filter to combine the first estimate of the wheel torque and the second estimate of the wheel torque, a third estimate of the wheel torque;
generating, based on applying an extended Kalman filter (EKF) with a damping process model to the third estimate of the wheel torque, a fourth estimate of the wheel torque;
generating, based on dividing the fourth estimate of the wheel torque, a plurality of wheel torque components corresponding to a propulsion of an engine of the vehicle, a braking of the engine of the vehicle, and an air brake of the vehicle; and
controlling, based on the plurality of wheel torque components, the vehicle.

2. The method of claim 1, wherein the first estimate of the wheel torque comprises a sum of an engine wheel torque and a foundation brake wheel torque.

3. The method of claim 1, wherein generating the second estimate of the wheel torque is further based on a weight of the vehicle and a grade of a road beneath the vehicle.

4. The method of claim 1, wherein generating the second estimate of the wheel torque is based on inverting a dynamic model of the vehicle, and wherein an input to the dynamic model comprises a shaft torque prior to amplification by a final drive ratio.

5. The method of claim 1, wherein a prediction noise matrix and a measurement noise matrix of the Kalman filter are calibrated based on test data generated by the vehicle for varying values of the wheel torque.

6. The method of claim 1, wherein the EKF is configured with a first state for the wheel torque and a second state for the velocity of the vehicle.

7. The method of claim 6, wherein the EKF is further configured to model torque damping and longitudinal dynamics of the vehicle.

8. The method of claim 1, wherein the mechanical model is a vehicle actuation model.

9. A method of controlling a vehicle, comprising:
receiving a first plurality of signals from one or more actuation components of the vehicle that include an engine, a transmission, a power steering module, or an anti-lock brake module;
generating, based on the first plurality of signals, a first estimate of a wheel torque;
receiving a second plurality of signals indicative of an acceleration of the vehicle, a velocity of the vehicle, and a grade of a road beneath the vehicle;
generating, based on the second plurality of signals, a second estimate of the wheel torque;
generating a third estimate of the wheel torque by combining the first estimate of the wheel torque and the second estimate of the wheel torque;
generating, based on dividing the third estimate of the wheel torque, a plurality of wheel torque components corresponding to a propulsion of the engine, a braking of the engine, and an air brake of the vehicle; and
controlling, based on the plurality of wheel torque components, the vehicle.

10. The method of claim 9, wherein the first plurality of signals comprises Controller Area Network (CAN) messages.

11. The method of claim 10, wherein the first estimate of the wheel torque comprises a sum of an engine wheel torque and a foundation brake wheel torque.

12. The method of claim 10, wherein generating the second estimate of the wheel torque is based on inverting a dynamic model of the vehicle, and wherein an input to the dynamic model comprises a shaft torque prior to amplification by a final drive ratio.

13. The method of claim 9, wherein the dividing the third estimate of the wheel torque is based on a parasitic friction in engine torque, a braking mode of the vehicle, and the velocity of the vehicle.

14. The method of claim 13, wherein the braking mode of the vehicle is selected from the group consisting of a no brake mode, an engine brake only mode, a foundation brake only mode, and an engine brake and foundation brake mode.

15. The method of claim 9, wherein at least one of the plurality of wheel torque components is determined using a Kalman filtering operation.

16. A non-transitory computer readable medium storing executable instructions for an autonomous driving vehicle that, when executed by at least one processor, cause the at least one processor to:
generate, using a dual filter framework, an updated estimate of a wheel torque; and
control, based on the updated estimate of the wheel torque, the vehicle,
wherein a first filter of the dual filter framework is configured to generate a blended estimate of the wheel torque by combining: (a) a first estimate of the wheel torque that is generated based on a mechanical model of at least a transmission of the vehicle and (b) a second estimate of wheel torque that is generated based on an inverted longitudinal dynamic model that is a function of a velocity of the vehicle and an acceleration of the vehicle, and wherein a second filter of the dual filter framework is configured to generate the updated estimate of the wheel torque and an updated estimate of the velocity of the vehicle by filtering the blended estimate of the wheel torque with a measurement of the velocity.

17. The non-transitory computer readable medium of claim 16, wherein the first filter is a Kalman filter configured to use the second estimate of the wheel torque as a state of the Kalman filter and the first estimate of the wheel torque as a measurement in the Kalman filter.

18. The non-transitory computer readable medium of claim 16, wherein the second filter is a non-linear extended Kalman filter that comprises a first state for the wheel torque and a second state for the velocity of the vehicle.

19. The non-transitory computer readable medium of claim 16, wherein the vehicle is an autonomous vehicle operating in a Society of Automotive Engineers (SAE) Level 4 (L4) automation mode.

20. The non-transitory computer readable medium of claim 16, wherein the vehicle is an autonomous vehicle operating in one of a Society of Automotive Engineers (SAE) Level 1 (L1) automation mode through an SAE Level 3 (L3) automation mode.

* * * * *